(12) United States Patent
He

(10) Patent No.: US 11,696,305 B2
(45) Date of Patent: Jul. 4, 2023

(54) SCHEDULING UPLINK TRANSMISSIONS USING RELAY DEVICES

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 17/338,886

(22) Filed: Jun. 4, 2021

(65) Prior Publication Data

US 2021/0400713 A1 Dec. 23, 2021

Related U.S. Application Data

(60) Provisional application No. 63/040,767, filed on Jun. 18, 2020.

(51) Int. Cl.
*H04W 72/23* (2023.01)
*H04W 72/1268* (2023.01)
(Continued)

(52) U.S. Cl.
CPC ............ *H04W 72/23* (2023.01); *H04B 7/155* (2013.01); *H04L 1/08* (2013.01); *H04L 5/0055* (2013.01);
(Continued)

(58) Field of Classification Search
CPC ............. H04W 72/14; H04W 28/0278; H04W 72/1268; H04W 72/1284; H04W 92/18;
(Continued)

(56) References Cited

U.S. PATENT DOCUMENTS

2016/0345209 A1* 11/2016 Talukdar ............... H04W 76/15
2017/0118671 A1 4/2017 Lee et al.
(Continued)

FOREIGN PATENT DOCUMENTS

WO WO-2017022164 A1 2/2017
WO WO-2020006388 A1 1/2020

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 16)," 3GPP Standard, Technical Specification, 3GPP TS 36.321, 3rd Generation Partnership Project (3GPP), Mobile Competence Centre, 650, Route Des Lucioles, F-06921, Sophia-Antipolis Cedex, France, vol. RAN WG2. No. V16.0.0, Apr. 8, 2020 (Apr. 8, 2020), pp. 1-141, XP051893879, Retrieved from http://ftp.3gpp.org/Specs/archive/36_series/36.321/36321-g00.zip 36321-g00.docx.
(Continued)

*Primary Examiner* — Afshawn M Towfighi
(74) *Attorney, Agent, or Firm* — Harrity & Harrity, LLP

(57) ABSTRACT

Various aspects of the present disclosure generally relate to wireless communication. In some aspects, a relay device may receive, from a first user equipment (UE) on a sidelink channel, a buffer status report. Accordingly, the relay device may receive, from a base station, a grant of an uplink resource based at least in part on determining a priority of data associated with the buffer status report. Additionally, the relay device may transmit, to the base station, the buffer status report based at least in part on receiving the grant of the uplink resource. Numerous other aspects are provided.

30 Claims, 11 Drawing Sheets

(51) Int. Cl.
  *H04W 28/02* (2009.01)
  *H04L 1/08* (2006.01)
  *H04L 5/00* (2006.01)
  *H04B 7/155* (2006.01)
  *H04W 72/21* (2023.01)
  *H04W 92/18* (2009.01)

(52) U.S. Cl.
  CPC .............. *H04W 28/0278* (2013.01); *H04W 72/1268* (2013.01); *H04W 72/21* (2023.01); *H04W 92/18* (2013.01)

(58) Field of Classification Search
  CPC ....... H04W 4/70; H04W 76/14; H04W 88/04; H04B 7/155; H04B 7/15542; H04L 1/08; H04L 5/0055; H04L 1/1822; H04L 1/1896; H04L 5/0094
  See application file for complete search history.

(56) References Cited

U.S. PATENT DOCUMENTS

| | | | | |
|---|---|---|---|---|
| 2017/0289908 A1* | 10/2017 | Lee | ................... | H04W 52/0216 |
| 2018/0054755 A1* | 2/2018 | Lee | ....................... | H04W 84/04 |
| 2019/0159236 A1* | 5/2019 | Xu | ........................ | H04W 76/18 |
| 2020/0029353 A1* | 1/2020 | Xu | .................... | H04W 52/0209 |
| 2020/0163005 A1* | 5/2020 | Rao | ......................... | H04W 8/24 |
| 2022/0232523 A1* | 7/2022 | Lee | ....................... | H04L 1/1887 |

OTHER PUBLICATIONS

Ericsson, "gNB-Scheduled Resource Allocation for Sidelink," 3GPP Draft, 3GPP TSG-RAN WG2 #106, R2-1907354—GNB-Scheduled Resource Allocation for Sidelink, 3rd Generation Partnership Project (3GPP), Mobile Competence Centre, 650, Route Des Lucioles, F-06921, Sophia-Antipolis Cedex, France, vol. RAN WG2. No. Reno, USA, May 13, 2019-May 17, 2019, May 13, 2019 (May 13, 2019), XP051730793, pp. 1-4, Retrieved from http://www.3gpp.org/ftp/Meetings%5F3GPP%5FSYNC/RAN2/Docs/R2%2D1907354%2Ezip.

Fraunhofer HHI, et al., "Resource Allocation for Mode 1 NR V2X," 3GPP Draft, 3GPP TSG RAN WG1 #99, R1-1912288, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051819982, pp. 1-16, Retrieved from https://ftp.3gpp.org/tsg_ran/WG1_RL1/TSGR1_99/Docs/R1-1912288.zip, R1-1912288_Mode1RA.docx.

International Search Report and Written Opinion—PCT/US2021/036186—ISA/EPO—dated Oct. 21, 2021.

* cited by examiner

US 11,696,305 B2

SCHEDULING UPLINK TRANSMISSIONS USING RELAY DEVICES

CROSS-REFERENCE TO RELATED APPLICATION

This Patent Application claims priority to U.S. Provisional Patent Application No. 63/040,767, filed on Jun. 18, 2020, entitled "SCHEDULING UPLINK TRANSMISSIONS USING RELAY DEVICES," and assigned to the assignee hereof. The disclosure of the prior Applications is considered part of and is incorporated by reference in this Patent Applications.

FIELD OF THE DISCLOSURE

Aspects of the present disclosure generally relate to wireless communication and to techniques and apparatuses for scheduling uplink transmissions using relay devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes transmitting an uplink request, wherein the uplink request includes at least one of a scheduling request, control information, or a combination thereof; receiving a grant of a sidelink resource based at least in part on transmitting the uplink request; and transmitting, to a relay device on a sidelink channel, a buffer status report based at least in part on receiving the grant of the sidelink resource.

In some aspects, a method of wireless communication performed by a relay device includes receiving, from a first UE on a sidelink channel, a buffer status report; receiving, from a base station, a grant of an uplink resource based at least in part on determining a priority of data associated with the buffer status report; and transmitting, to the base station, the buffer status report based at least in part on receiving the grant of the uplink resource.

In some aspects, a method of wireless communication performed by a base station includes receiving an uplink request, wherein the uplink request includes at least one of a scheduling request, control information, or a combination thereof; transmitting a grant of a sidelink resource based at least in part on receiving the uplink request; and receiving, from a relay device, a buffer status report associated with a first UE, based at least in part on transmitting the grant of the sidelink resource.

In some aspects, a non-transitory computer-readable medium storing a set of instructions for wireless communication includes one or more instructions that, when executed by one or more processors of a first UE, cause the first UE to transmit an uplink request, wherein the uplink request includes at least one of a scheduling request, control information, or a combination thereof; receive a grant of a sidelink resource based at least in part on transmitting the uplink request; and transmit, to a relay device on a sidelink channel, a buffer status report based at least in part on receiving the grant of the sidelink resource.

In some aspects, a non-transitory computer-readable medium storing a set of instructions for wireless communication includes one or more instructions that, when executed by one or more processors of a relay device, cause the relay device to receive, from a first UE on a sidelink channel, a buffer status report; receive, from a base station, a grant of an uplink resource based at least in part on determining a priority of data associated with the buffer status report; and transmit, to the base station, the buffer status report based at least in part on receiving the grant of the uplink resource.

In some aspects, a non-transitory computer-readable medium storing a set of instructions for wireless communication includes one or more instructions that, when executed by one or more processors of a base station, cause the base station to receive an uplink request, wherein the uplink request includes at least one of a scheduling request, control information, or a combination thereof; transmit a grant of a sidelink resource based at least in part on receiving the uplink request; and receive, from a relay device, a buffer status report associated with a first UE, based at least in part on transmitting the grant of the sidelink resource.

In some aspects, a first UE for wireless communication includes a memory and one or more processors coupled to the memory, the memory and the one or more processors configured to transmit an uplink request, wherein the uplink request includes at least one of a scheduling request, control information, or a combination thereof; receive a grant of a sidelink resource based at least in part on transmitting the uplink request; and transmit, to a relay device on a sidelink channel, a buffer status report based at least in part on receiving the grant of the sidelink resource.

In some aspects, a relay device for wireless communication includes a memory and one or more processors coupled to the memory, the memory and the one or more processors configured to receive, from a first UE on a sidelink channel, a buffer status report; receive, from a base station, a grant of an uplink resource based at least in part on determining a priority of data associated with the buffer status report; and transmit, to the base station, the buffer status report based at least in part on receiving the grant of the uplink resource.

In some aspects, a base station for wireless communication includes a memory and one or more processors coupled to the memory, the memory and the one or more processors configured to receive an uplink request, wherein the uplink request includes at least one of a scheduling request, control information, or a combination thereof; transmit a grant of a sidelink resource based at least in part on receiving the uplink request; and receive, from a relay device, a buffer status report associated with a first UE, based at least in part on transmitting the grant of the sidelink resource.

In some aspects, an apparatus for wireless communication includes means for transmitting an uplink request, wherein the uplink request includes at least one of a scheduling request, control information, or a combination thereof; means for receiving a grant of a sidelink resource based at least in part on transmitting the uplink request; and means for transmitting, to a relay device on a sidelink channel, a buffer status report based at least in part on receiving the grant of the sidelink resource.

In some aspects, an apparatus for wireless communication includes means for receiving, from a first UE on a sidelink channel, a buffer status report; means for receiving, from a base station, a grant of an uplink resource based at least in part on determining a priority of data associated with the buffer status report; and means for transmitting, to the base station, the buffer status report based at least in part on receiving the grant of the uplink resource.

In some aspects, an apparatus for wireless communication includes means for receiving an uplink request, wherein the uplink request includes at least one of a scheduling request, control information, or a combination thereof; means for transmitting a grant of a sidelink resource based at least in part on receiving the uplink request; and means for receiving, from a relay device, a buffer status report associated with a first UE, based at least in part on transmitting the grant of the sidelink resource.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
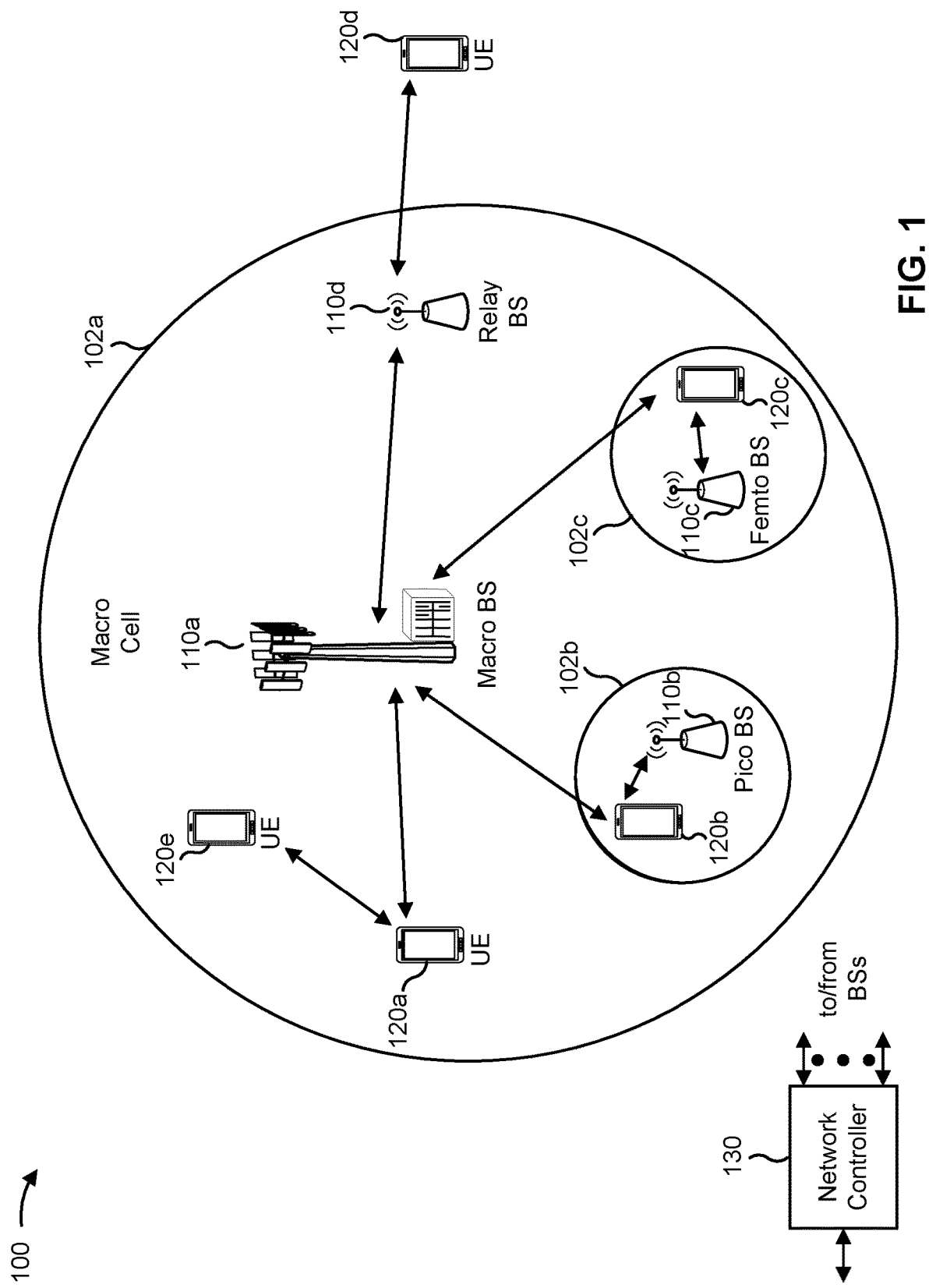
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
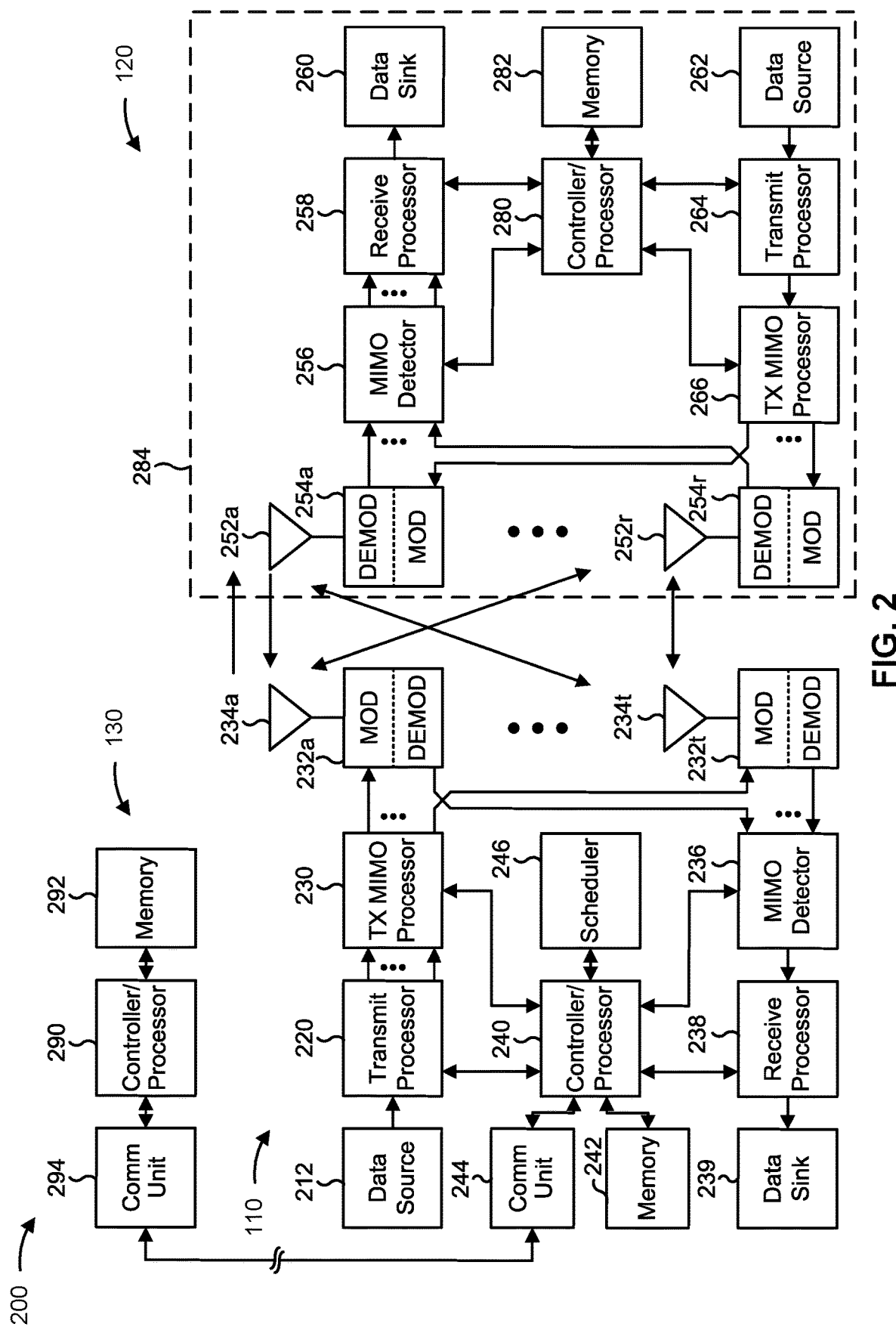
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5A-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5A-10).

Controller/processor 240 of base station 110, controller/processor 280 of UE 120, and/or any other component(s) of FIG. 2 may perform one or more techniques associated with scheduling uplink transmissions using relay devices, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples. In some aspects, the relay device described herein is the UE 120, is included in the UE 120, or includes one or more components of the UE 120 shown in FIG. 2. As an alternative, the relay device described herein is the base station 110, is included in the base station 110, or includes one or more components of the base station 110 shown in FIG. 2.

In some aspects, a first UE (e.g., the UE 120e or the UE 120d) may include means for transmitting an uplink request, wherein the uplink request includes at least one of a scheduling request, control information, or a combination thereof; means for receiving a grant of a sidelink resource based at least in part on transmitting the uplink request; and/or means for transmitting, to a relay device (e.g., the UE 120a or the relay BS 110d) on a sidelink channel, a buffer status report based at least in part on receiving the grant of the sidelink resource. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a relay device (e.g., the UE 120a or the relay BS 110d) may include means for receiving, from a first UE (e.g., the UE 120e or the UE 120d) on a sidelink channel, a buffer status report; means for receiving, from a base station (e.g., the base station 110a), a grant of an uplink resource based at least in part on determining a priority of data associated with the buffer status report; and/or means for transmitting, to the base station, the buffer status report based at least in part on receiving the grant of the uplink resource. In some aspects, the means for the relay device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. As an alternative, the means for the relay device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., the base station 110a) may include means for receiving an uplink request, wherein the uplink request includes at least one of a scheduling request, control information, or a combination thereof; means for transmitting a grant of a sidelink resource based at least in part on receiving the uplink request; and/or means for receiving, from a relay device (e.g., the UE 120a or the relay BS 110d), a buffer status report associated with a first UE (e.g., the UE 120e or the UE 120d), based at least in part on transmitting the grant of the sidelink resource. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
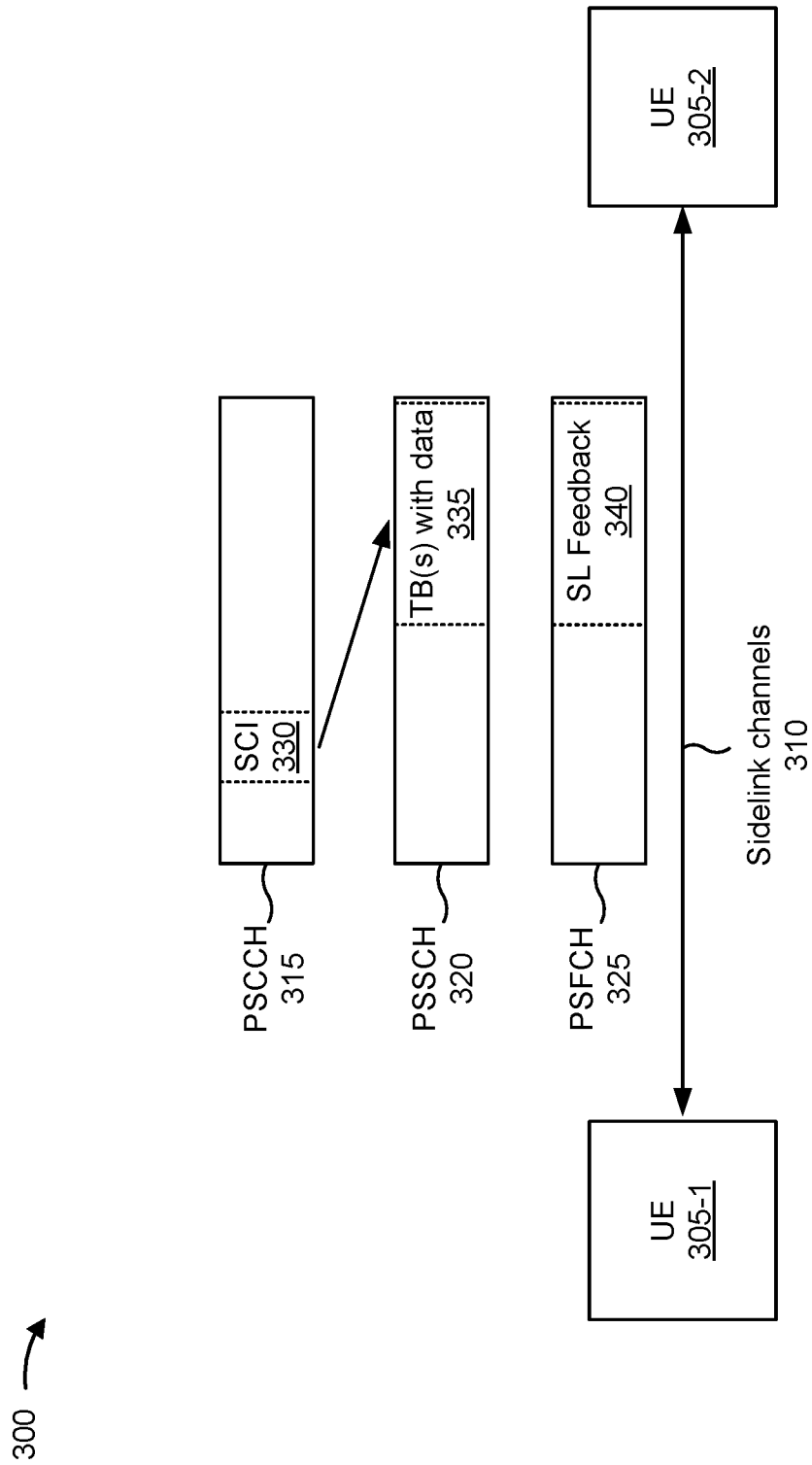
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
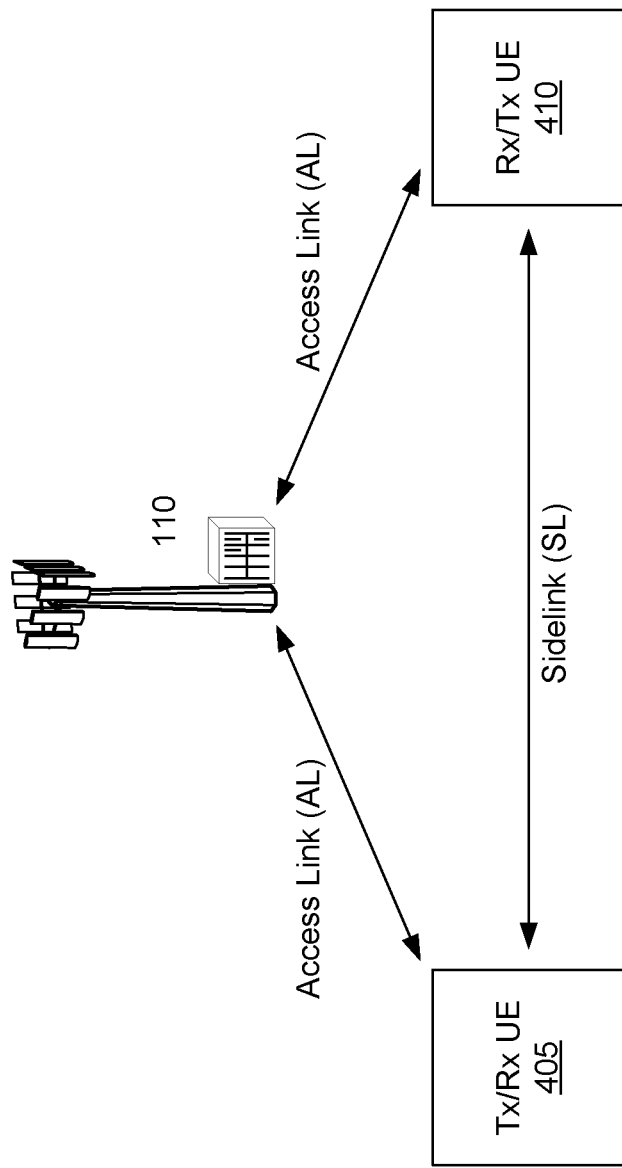
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

A sidelink channel may be used to relay information from a UE to a base station through a relay device, such as a relay UE, a mobile termination (MT) unit in an integrated access backhauling (IAB) network, and/or another type of relay device. However, scheduling uplink transmissions to the base station relies on the UE cooperating with the relay device and on the relay device cooperating with the base station to schedule those uplink transmissions that the relay device is forwarding, from the UE, to the base station. Without proper scheduling, the relay device will forward uplink communications without regard to priorities associated with the uplink communications. For example, the relay device may forward uplink communications in the order in which they were received rather than based on priorities associated the uplink communications, which increases latency and reduces functionality for the UE.

Some techniques and apparatuses described herein enable scheduling of uplink communications from a UE (e.g., remote UE 305-2) to a relay device (e.g., relay UE 305-1) on a sidelink channel as well as scheduling of those uplink communications from the relay device to a base station (e.g., base station 110). The relay device 305-1 may perform scheduling based at least in part on a scheduling group associated with the UE 305-2 and/or a mapping between a logical channel priority on the sidelink channel and on a channel between the relay device and the base station 110. As a result, the relay device 305-1 reduces latency for uplink communications from the UE 305-2 that have higher priority. Accordingly, because the relay device 305-1 accommodates uplink communications with different priorities, the UE 305-2 can provide functionalities to a user that depend on low latency as well as different functionalities that do not depend on low latency.

Figure 5A:
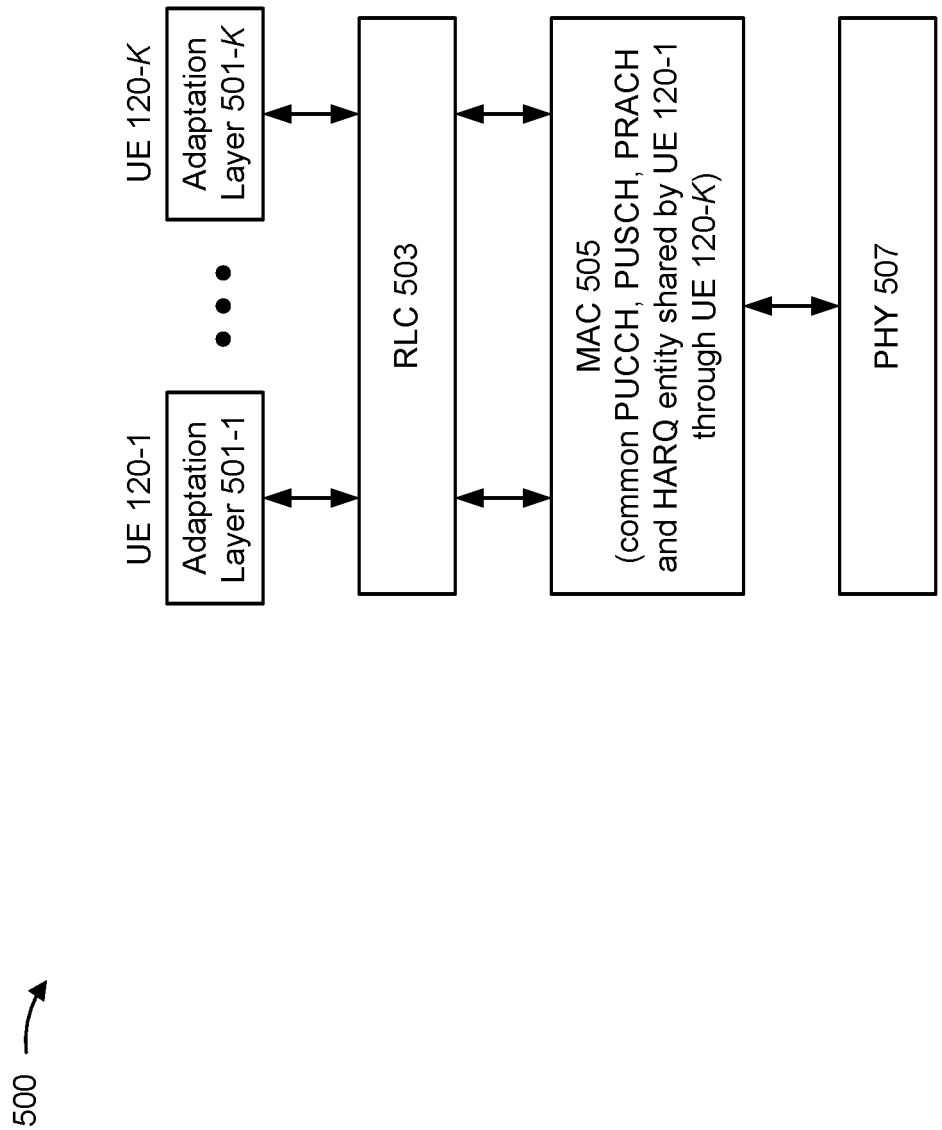
FIGS. 5A and 5B are diagrams illustrating example architectures for scheduling groups served by a relay device, in accordance with the present disclosure.
Figure 5B:
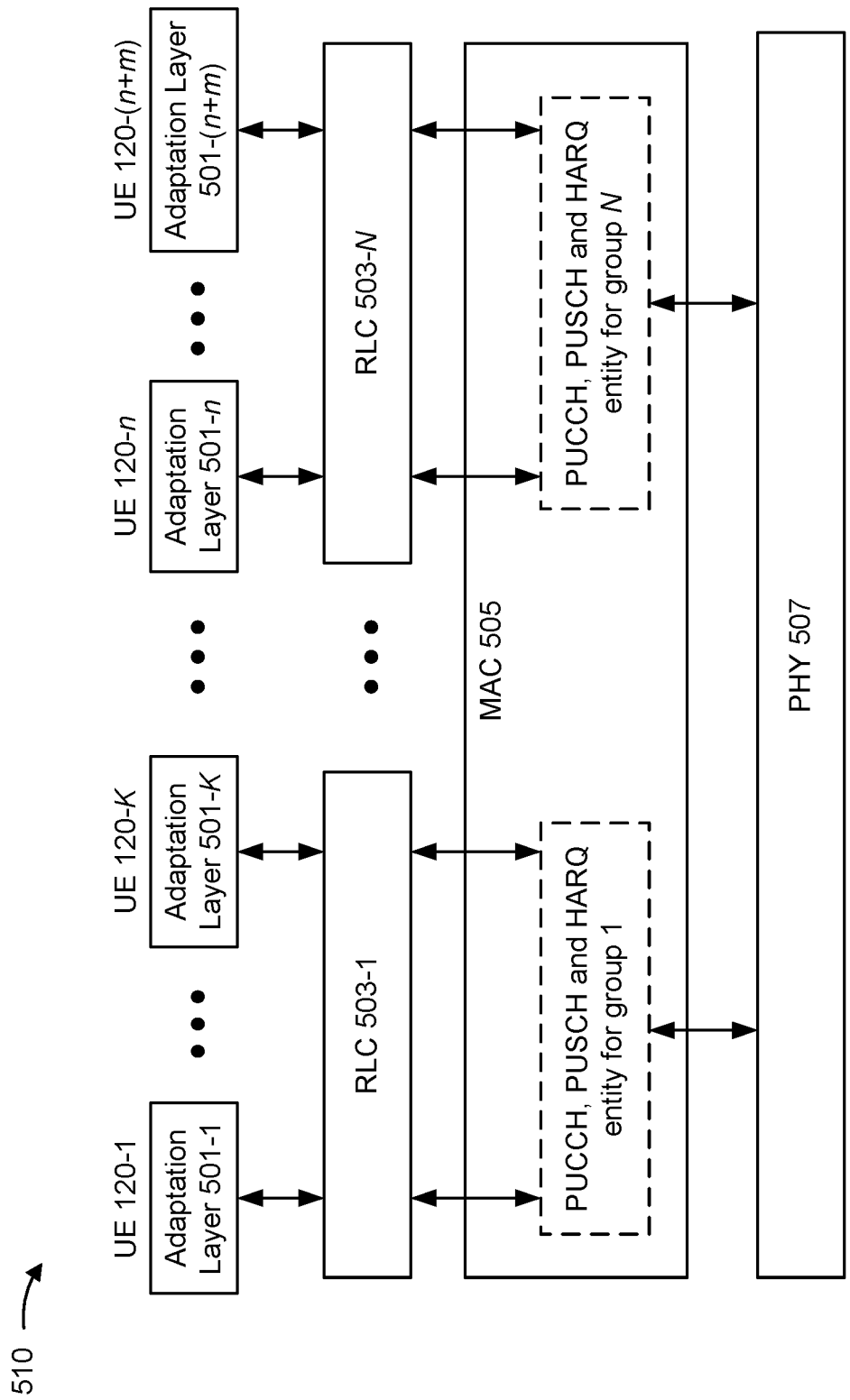

FIGS. 5A and 5B are diagrams illustrating example architectures 500 and 510 for scheduling groups served by a relay device, in accordance with the present disclosure. As shown in FIG. 5A, example 500 includes a single scheduling group with a plurality of UEs (e.g., including a quantity represented by K) including UE 120-1 through UE 120-K. Similarly, as shown in FIG. 5B, example 510 includes a plurality of scheduling groups (e.g., including a quantity represented by N), with at least one group having a first plurality of UEs (e.g., including a quantity represented by K) including UE 120-1 through UE 120-K, and another group having a second plurality of UEs (e.g., including a quantity represented by m+1) including UE 120-$n$ through UE 120-($n$+m). Although described in connection with one or two scheduling groups, the description below similarly applies to additional scheduling groups, such as three, four, and so on.

As shown in FIGS. 5A and 5B, UEs within a scheduling group may share a radio link control (RLC) layer (e.g., RLC layer 503 in example 500 and RLC layers 503-1 through 503-N in example 510) and may share a physical (PHY) layer 507. As further shown in FIGS. 5A and 5B, UEs within a scheduling group may share a medium access control (MAC) layer. For example, the relay device may multiplex RLC service data units (SDUs) in a same MAC protocol data unit (PDU) on a link with a base station (e.g., base station 110).

Accordingly, as shown in FIG. 5A, a first UE (e.g., UE 120-1) may share a MAC layer with the relay device and, optionally, with other UEs (e.g., UE 120-K). Additionally, or alternatively, as shown in FIG. 5A, the first UE may share a radio network temporary identifier (RNTI) with the relay device, such as the relay device's cell RNTI (C-RNTI).

In some aspects, a relay device may serve multiple scheduling groups, as shown in FIG. 5B. Accordingly, as shown in FIG. 5B, a first UE (e.g., UE 120-1) may use a MAC layer that is distinct from a second MAC layer shared by the relay device and at least one second UE (e.g., UE 120-$n$) Additionally, or alternatively, as shown in FIG. 5B, the first UE may use a first RNTI (e.g., group 1's RNTI) that is distinct from a second RNTI (e.g., group N's RNTI) shared by the relay device and at least one second UE (e.g., UE 120-$n$).

As further shown in FIGS. 5A and 5B, all UEs may share a physical random access channel (PRACH) with the relay device regardless of a scheduling group to which the UEs belong. Moreover, UEs within a scheduling group may share a HARQ entity, a PUCCH, and a PUSCH with the relay device. For example, as shown in FIG. 5B, each scheduling group has a HARQ entity, PUCCH, and PUSCH associated with that scheduling group. Accordingly, the relay device may share multiple HARQ entities, PUCCHs, and PUSCHs, depending at least in part on the number of scheduling groups the relay device supports.

As shown in FIGS. 5A and 5B, each RLC PDU may be encapsulated with a header from a corresponding adaptation layer (e.g., adaptation layers 501-1 through 501-K in example 500 or example 510 and/or adaptation layers 501-$n$ through 501-($n$+m) in example 510) that includes a unique identifier for each UE. Accordingly, a first UE (e.g., UE 120-1) may transmit an uplink request to the relay device that is associated with an RLC PDU that includes an identifier of the first UE. For example, the uplink request may include a scheduling request, control information (e.g., a MAC control element (MAC-CE)), or a combination thereof.

As indicated above, FIGS. 5A and 5B are provided as examples. Other examples may differ from what is described with respect to FIGS. 5A and 5B.

Figure 6:
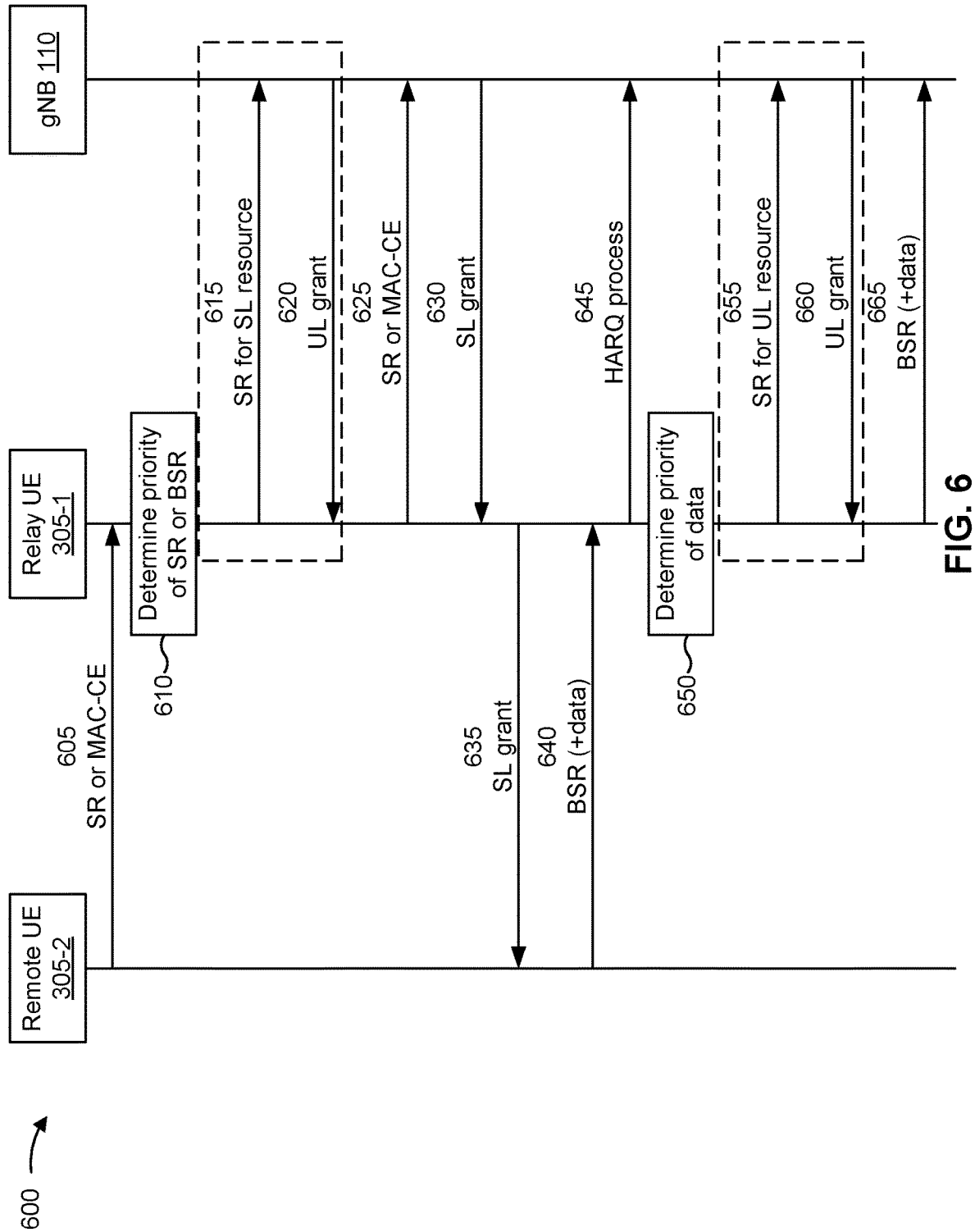
FIG. 6 is a diagram illustrating an example associated with scheduling uplink transmissions from a remote UE via a relay device, in accordance with the present disclosure.

FIG. 6 is a diagram illustrating an example 600 of scheduling uplink transmissions from a remote UE 305-2 via a relay device (e.g., relay UE 305-1), in accordance with the present disclosure. As shown in FIG. 6, example 600 includes a base station (e.g., a gNB 110), the remote UE 305-2, and the relay UE 305-1. Although the description below focuses on the relay device being a UE, the description similarly applies to the relay device being a relay BS, an MT unit, and/or another type of relay device.

In example 600, and as described above in connection with FIG. 5A, the remote UE 305-2 may share a MAC layer and/or a RNTI with the relay UE 305-1. Additionally, or alternatively, and as described above in connection with FIG. 5B, the remote UE 305-2 may use a first MAC layer and/or a first RNTI that is distinct from a second MAC layer and/or a second RNTI, respectively, shared by relay UE 305-1 and at least one second UE (e.g., another remote UE in a different scheduling group).

As shown in connection with reference number 605, the remote UE 305-2 may transmit an uplink request including at least one of a scheduling request, control information (e.g., a MAC-CE), or a combination thereof. In some aspects, the remote UE 305-2 may transmit the uplink request based at least in part on an arrival of new data at the remote UE 305-2 that triggers a buffer status report (BSR). For example, a BSR may be triggered when a buffer of the remote UE 305-2 is empty before the arrival of the new data and/or a priority associated with the new data is higher than one or more priorities associated with non-empty logical channels of the remote UE 305-2. In some aspects, the remote UE 305-2 may transmit the uplink request based at least in part on determining a priority of data that triggered the uplink request.

In some aspects, the uplink request may include a scheduling request on the sidelink channel. For example, the remote UE 305-2 may transmit the scheduling request to the relay UE 305-1 on a PSFCH. In some aspects, the PSFCH may be one of a plurality of PSFCHs, and the PSFCH may be selected by the remote UE 305-2 based at least in part on a priority of data that triggered the scheduling request. For example, the plurality of PSFCHs may be associated with a plurality of logical channel sets, and the plurality of logical channel sets may be associated with different priorities (e.g., as described below in connection with reference number 610). Additionally, or alternatively, and as described above in connection with FIGS. 5A and 5B, the scheduling request may be associated with an RLC PDU that includes an identifier of the remote UE 305-2.

Additionally, or alternatively, the uplink request may include a MAC-CE. In some aspects, the remote UE 305-2 may transmit the MAC-CE on a PSSCH. For example, the remote UE 305-2 may transmit the MAC-CE in lieu of a scheduling request (e.g., as described above) when the PSSCH is available. Accordingly, the MAC-CE may be transmitted without triggering the scheduling request. In some aspects, remote UE 305-2 may transmit a BSR MAC-CE in order to cancel a pending BSR (e.g., a BSR that was triggered as described above).

As shown in connection with reference number 610, the relay UE 305-1 may determine a priority of data associated with the uplink request (e.g., the scheduling request and/or the control information). For example, the relay UE 305-1 may determine the priority of data based at least in part on a priority of a logic channel in the uplink request (e.g., the scheduling request and/or the control information). For example, the priority of the data may be a highest priority of a logical channel associated with the PSFCH resource in which the relay UE 305-1 received the uplink request. Additionally, or alternatively, when the uplink request includes a BSR MAC-CE, the priority of the data may be a highest priority of a logical channel in a non-empty logical channel group in the BSR.

As shown in connection with reference number 615, the gNB 110 may receive, from the relay UE 305-1, a scheduling request for a request for the sidelink resource (e.g., as described below in connection with reference number 625). In some aspects, the relay UE 305-1 may transmit the scheduling request when a scheduling request prohibit timer associated with the priority of the data is not running and/or when data buffers of equal or higher priority than the priority of the data are empty. Accordingly, the relay UE 305-1 may transmit scheduling requests for higher-priority data from the remote UE 305-2 (and/or other UEs in a same scheduling group as the remote UE 305-2) before transmitting scheduling requests for lower-priority data.

In some aspects, the relay UE 305-1 may retransmit the scheduling request to the gNB 110 on one or more scheduled PUCCH resources until the gNB 110 fulfils the scheduling request (e.g., by transmitting an uplink grant as described below in connection with reference number 620). In some aspects, the relay UE 305-1 may halt retransmission of the scheduling request after a limit has been satisfied. For example, the limit may be configured by the gNB 110 via a radio resource control (RRC) message.

In some aspects, the scheduling request may be a multi-bit scheduling request. Accordingly, the scheduling request may include an identification of the remote UE 305-2 (e.g., a UE identifier (UE ID) and/or another identifier). As an alternative, the scheduling request may include a RNTI associated with a scheduling group including the remote UE 305-2.

As shown in connection with reference number 620, the gNB 110 may transmit, and the relay UE 305-1 may receive, an uplink grant for the request for the sidelink resource. In some aspects, the uplink grant may be addressed to a RNTI for a scheduling group including the remote UE 305-2.

As shown in connection with reference number 625, the relay UE 305-1 may transmit, and the gNB 110 may receive, an uplink request that includes at least one of a scheduling request, control information (e.g., a MAC-CE), or a combination thereof. For example, the gNB 110 may receive the uplink request based at least in part on transmitting the uplink grant for the request (e.g., as described above in connection with reference number 620).

In some aspects, the uplink request received by the gNB 110 may include the request for a sidelink resource. For example, the gNB 110 may receive, from the relay UE 305-1, the request for the sidelink resource on a PUSCH. For example, the relay UE 305-1 may transmit the request for the sidelink resource (e.g., a MAC-CE) without transmitting a scheduling request (e.g., as described above in connection with reference number 615) when the PUSCH is available. Accordingly, the relay UE 305-1 may perform actions described in connection with reference number 625 without performing actions described in connection with reference numbers 615 and 620.

In some aspects, the relay UE 305-1 may transmit the request for the sidelink resource based at least in part on determining a priority of data (e.g., as described above in connection with reference number 610). For example, the relay UE 305-1 may transmit the request for the sidelink resource on a PUCCH selected based at least in part on the priority of the data (e.g., by mapping the priority of the data to one of a plurality of PUCCH resources).

In some aspects, the request for the sidelink resource may be a MAC-CE. For example, the request may be a BSR MAC-CE. In some aspects, the request for the sidelink resource may include an identifier of the remote UE 305-2 (e.g., a UE ID and/or na RNTI) and/or a BSR of the remote UE 305-2.

As shown in connection with reference number 630, the gNB 110 may transmit, and the relay UE 305-1 may receive, a grant of a sidelink resource based at least in part on receiving the uplink request (e.g., as described above in connection with reference number 625). For example, the gNB 110 may transmit the grant of the sidelink resource to the relay UE 305-1.

As shown in connection with reference number 635, the relay UE 305-1 may transmit, and the remote UE 305-2 may receive, a grant of a sidelink resource based at least in part on the remote UE 305-2 transmitting the uplink request (e.g., as described above in connection with reference number 605). For example, the remote UE 305-2 may receive the grant of the sidelink resource from the relay UE 305-1 on a PSCCH.

In some aspects, the remote UE 305-2, the relay UE 305-1, and the gNB 110 may repeat one or more operations described above in connection with reference numbers 605-635 after the remote UE 305-2 receives the grant of the sidelink resource. For example, the remote UE 305-2 may transmit a scheduling request to the relay UE 305-1 and, based at least in part on receiving the grant of the sidelink resource from the gNB 110 through relay UE 305-1, transmit a MAC-CE (e.g., a BSR MAC-CE) to the relay UE 305-1. In this example, the remote UE 305-2 may use the same sidelink resource to transmit a BSR (e.g., associated with and/or transmitted with data) to the relay UE 305-1 (e.g., as described below in connection with reference number 640) and/or may receive a grant of a new sidelink resource from the gNB 110 through relay UE 305-1.

As shown in connection with reference number 640, the remote UE 305-2 may transmit, and the relay UE 305-1 may receive on the sidelink channel, a BSR (e.g., associated with and/or transmitted with data), based at least in part on receiving the grant of the sidelink resource (e.g., as described above in connection with reference number 635). Accordingly, the relay UE 305-1 may receive, from the remote UE 305-2 on the sidelink channel, the BSR.

As shown in connection with reference number 645, the relay UE 305-1 may perform a HARQ process with the gNB 110. For example, the relay UE 305-1 may provide HARQ feedback based at least in part on whether information was received from the remote UE 305-2 on a PSSCH.

In some aspects, the relay UE 305-1 may fail to receive information from the remote UE 305-2, based at least in part on transmitting the grant of the sidelink resource to the remote UE 305-2 (e.g., as described above in connection with reference number 635). Accordingly, the relay UE 305-1 may transmit, to the gNB 110, a NACK signal based at least in part on failing to receive the information from the remote UE 305-2.

In some aspects, the relay UE 305-1 may receive, from the gNB 110, a retransmission of the grant of the sidelink resources based at least in part on transmitting the NACK signal. Additionally, or alternatively, the relay UE 305-1 may retransmit, to the remote UE 305-2, the grant of the sidelink resource. Accordingly, the remote UE 305-2 may receive the retransmission of the grant of the sidelink resource and retransmit, to the relay UE 305-1, the information (e.g., a BSR and/or data) as described above in connection with reference number 640.

In some aspects, the relay UE 305-1 may transmit, to the gNB 110, an ACK signal based at least in part on receiving information from the remote UE 305-2. For example, the relay UE 305-1 may transmit, to the gNB 110, the ACK signal such that the gNB 110 does not retransmit again, to the remote UE 305-2, the grant of the sidelink resource.

As shown in connection with reference number 650, the relay UE 305-1 may determine a priority of data associated with the BSR. For example, the relay UE 305-1 may determine the priority of data similar to the determination described above in connection with reference number 610.

As shown in connection with reference number 655, the relay UE 305-1 may transmit, and the gNB 110 may receive, a scheduling request for a grant of an uplink resource for the BSR. For example, the scheduling request may be associated with the grant of an uplink resource for the relay UE 305-1 to use for sending the BSR to the gNB 110. In some aspects, the relay UE 305-1 may transmit the scheduling request based at least in part on determining the priority of data (e.g., as described above in connection with reference number 650).

As shown in connection with reference number 660, the gNB 110 may transmit, and the relay UE 305-1 may receive, the grant of the uplink resource for the BSR (e.g., associated with and/or transmitted with data). In some aspects, the gNB 110 may transmit the grant of the uplink resource based at least in part on receiving a scheduling request (e.g., as described above in connection with reference number 655). In some aspects, the grant of the uplink resource may be associated with the priority of data determined by the relay UE 305-1. For example, a determination of higher priority may result in the gNB 110 transmitting the grant of the uplink resource faster than for a determination of lower priority. In some aspects, the uplink grant may be addressed to a RNTI for a scheduling group including the remote UE 305-2.

As shown in connection with reference number 665, the relay UE 305-1 may transmit, and the gNB 110 may receive, the BSR (e.g., associated with and/or transmitted with data) based at least in part on transmitting the grant of the uplink resource (e.g., as described above in connection with reference number 660). In some aspects, the BSR may include a total amount of data buffered by the relay UE 305-1 for UEs in a scheduling group including the remote UE 305-2. Additionally, or alternatively, the BSR may include an amount of data buffered by the relay UE 305-1 for the remote UE 305-2. In some aspects, the BSR may be associated with data from the remote UE 305-2 that the relay UE 305-1 transmitted to the gNB 110 with the BSR.

In some aspects, the remote UE 305-2, the relay UE 305-1, and the gNB 110 may repeat one or more operations described above in connection with reference numbers 640-665 to continue transmitting data from the remote UE 305-2 to the gNB 110. For example, the remote UE 305-2 may use the same sidelink resource to transmit an updated BSR (e.g., associated with and/or transmitted with additional data) to the relay UE 305-1 and/or may transmit a new scheduling request and/or MAC-CE (e.g., as described above in connection with reference number 605) in order to receive a grant of a new sidelink resource, from the gNB 110 through relay UE 305-1, for transmitting the updated BSR.

As indicated above, FIG. 6 is provided as an example. Other examples may differ from what is described with respect to FIG. 6.

Figure 7:
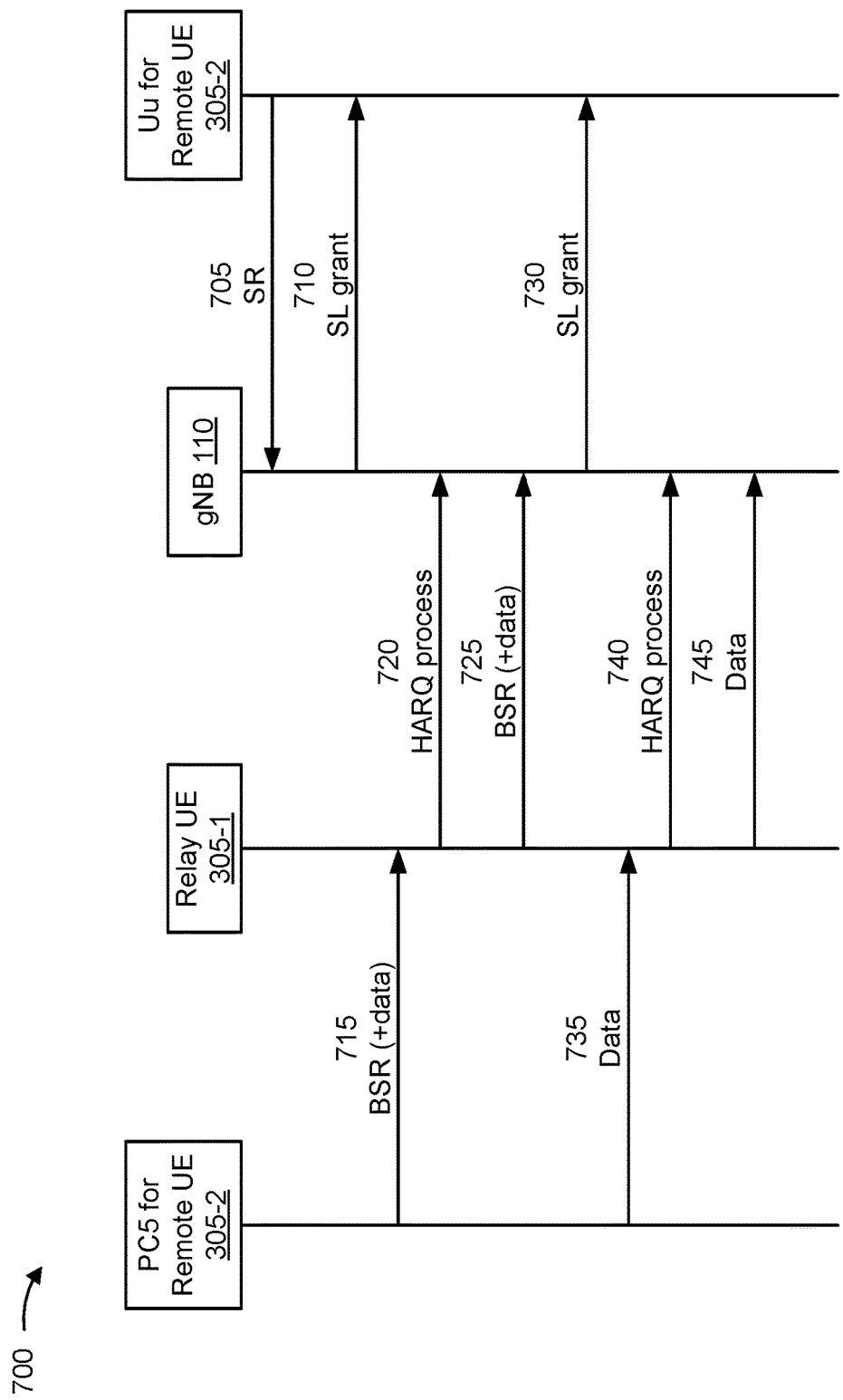
FIG. 7 is a diagram illustrating another example associated with scheduling uplink transmissions from a remote UE via a relay device, in accordance with the present disclosure.

FIG. 7 is a diagram illustrating an example 700 of scheduling uplink transmissions from a remote UE 305-2 via a relay device (e.g., relay UE 305-1), in accordance with the present disclosure. As shown in FIG. 7, example 700 includes a base station (e.g., a gNB 110), the remote UE 305-2, and the relay UE 305-1. Although the description below focuses on the relay device being a UE, the description similarly applies to the relay device being an MT unit, a relay BS, and/or another type of relay device.

In example 700, the remote UE 305-2 communicates with the gNB 110 on a Uu interface as well as communicating with the relay UE 305-1 on a PC5 interface. For example, as shown in FIG. 7, the remote UE 305-2 may receive messages and/or other information from the base station on a PDCCH on the Uu interface and transmit messages and/or other information to the relay UE 305-1 on a PUCCH on the Uu interface. Accordingly, the remote UE 305-2 may receive downlink control information (DCI), uplink control information (UCI), and/or SCI from, and transmit scheduling requests to, the gNB 110 on the Uu interface and transmit messages (e.g., control elements, such as MAC-CEs) and/or other data to the relay UE 305-1 on the PC5 interface. As an alternative, and as described below in connection with combining example 600 with example 700, the remote UE 305-2 may receive messages and/or other information from the gNB 110 on a PDCCH on the Uu interface and transmit scheduling requests, messages (e.g., MAC-CEs), and/or other information to the relay UE 305-1 on a PUCCH on the PC5 interface. As another alternative, and as described below in connection with combining example 600 with example 700, the remote UE 305-2 may receive messages and/or other information from the gNB 110 on a PDCCH on the Uu interface as well as transmit scheduling requests and/or other information to the gNB 110 on a PUCCH, and/or a PUSCH on the Uu interface. In this example, the remote UE 305-2 may transmit only MAC-CEs to the relay UE 305-1 on the PC5 interface.

In example 700, and as described above in connection with FIG. 5A, the remote UE 305-2 may share a MAC layer and/or a RNTI with the relay UE 305-1. Additionally, or alternatively, and as described above in connection with FIG. 5B, the remote UE 305-2 may use a first MAC layer and/or a first RNTI that is distinct from a second MAC layer and/or a second RNTI, respectively, shared by relay UE 305-1 and at least one second UE (e.g., another remote UE in a different scheduling group).

As shown in connection with reference number 705, the remote UE 305-2 may transmit, and the gNB 110 may receive, an uplink request including at least one of a scheduling request, control information (e.g., a MAC-CE), or a combination thereof. For example, as shown in FIG. 7, the uplink request may include a scheduling request.

In some aspects, the uplink request may include a scheduling request on the Uu interface associated with a scheduling group including the remote UE 305-2. In some aspects, the remote UE 305-2 may transmit the scheduling request based at least in part on an arrival of new data at the remote UE 305-2 that triggers a BSR. For example, a BSR may be triggered when a buffer of the remote UE 305-2 is empty before the arrival of the new data and/or a priority associated with the new data is higher than one or more priorities associated with non-empty logical channels of the remote UE 305-2. In some aspects, the remote UE 305-2 may transmit the uplink request based at least in part on determining a priority of data that triggered the uplink request.

In some aspects, the remote UE 305-2 may transmit the scheduling request to the gNB 110 on a PUCCH. In some aspects, the PUCCH may be one of a plurality of PUCCHs, and the PUCCH may be selected by the remote UE 305-2 based at least in part on a priority of data that triggered the scheduling request. For example, the plurality of PUCCHs may be associated with a plurality of logical channel sets, and the plurality of logical channel sets may be associated with different priorities. Additionally, or alternatively, and as described above in connection with FIGS. 5A and 5B, the scheduling request may be associated with an RLC PDU that includes an identifier of the remote UE 305-2.

As shown in connection with reference number 710, the gNB 110 may transmit, and the remote UE 305-2 may receive, a grant of a sidelink resource based at least in part on receiving the uplink request (e.g., as described above in connection with reference number 705). For example, the gNB 110 may transmit the grant of the sidelink resource to the remote UE 305-2 over the Uu interface. In some aspects, the gNB 110 may additionally transmit the grant of the sidelink resource to the relay UE 305-1.

As shown in connection with reference number 715, the remote UE 305-2 may transmit, and the relay UE 305-1 may receive on the sidelink channel, a BSR (e.g., associated with and/or transmitted with data), based at least in part on receiving the grant of the sidelink resource (e.g., as described above in connection with reference number 710). Accordingly, the relay UE 305-1 may receive, from the remote UE 305-2 on the PC5 interface, the BSR.

As shown in connection with reference number 720, the relay UE 305-1 may perform a HARQ process with the base station 110. For example, the relay UE 305-1 may provide, and the base station 110 may receive, HARQ feedback based on whether information was received from the remote UE 305-2 on a PSSCH.

In some aspects, the relay UE 305-1 may fail to receive information from the remote UE 305-2, based at least in part on transmitting the grant of the sidelink resource to the remote UE 305-2 (e.g., as described above in connection with reference number 710). Accordingly, the relay UE 305-1 may transmit, to the gNB 110, a NACK signal based at least in part on failing to receive the information from the remote UE 305-2.

In some aspects, the relay UE 305-1 may receive, from the gNB 110, a retransmission of the grant of the sidelink resources based at least in part on transmitting the NACK signal. Additionally, or alternatively, the relay UE 305-1 may retransmit, to the remote UE 305-2, the grant of the sidelink resource. Accordingly, the remote UE 305-2 may receive the retransmission of the grant of the sidelink resource and retransmit, to the relay UE 305-1, the information (e.g., a BSR and/or data) as described above in connection with reference number 715.

In some aspects, the relay UE 305-1 may transmit, and the gNB 110 may receive, an ACK signal based at least in part on receiving information from the remote UE 305-2. For example, the relay UE 305-1 may transmit, to the gNB 110, the ACK signal such that the gNB 110 does not retransmit again, to the remote UE 305-2, the grant of the sidelink resource.

As shown in connection with reference number 725, the relay UE 305-1 may transmit, and the gNB 110 may receive, the BSR (e.g., associated with and/or transmitted with data) based at least in part on transmitting the grant of the sidelink resource (e.g., as described above in connection with reference number 710). In some aspects, the BSR may include a total amount of data buffered by the relay UE 305-1 for UEs in a scheduling group including the remote UE 305-2. Additionally, or alternatively, the BSR may include an amount of data buffered by the relay UE 305-1 for the remote UE 305-2. In some aspects, the BSR may be associated with data from the remote UE 305-2 that the relay UE 305-1 transmitted to the gNB 110 with the BSR.

In some aspects, the relay UE 305-1 may receive, from the gNB 110, a grant of an uplink resource. Accordingly, the relay UE 305-1 may transmit, to the gNB 110, the BSR (e.g., associated with and/or transmitted with data) based at least in part on receiving the grant of the uplink resource.

In some aspects, the relay UE 305-1 may receive the grant of the uplink resource based at least in part on determining a priority of data associated with the BSR. For example, the relay UE 305-1 may determine the priority of data based at least in part on a priority of a logic channel in the BSR. For example, the priority of the data may be a highest priority of a logical channel associated with the PSSCH resource in which the relay UE 305-1 received the BSR. Additionally, or alternatively, when the BSR includes a BSR MAC-CE, the priority of the data may be a highest priority of a logical channel in a non-empty logical channel group in the BSR.

As shown in connection with reference number 730, the gNB 110 may transmit, and the remote UE 305-2 may receive, a grant of a sidelink resource based at least in part on the uplink request (e.g., as described above in connection with reference number 705). In some aspects, the remote UE 305-2 may receive the grant of the sidelink resource from the gNB 110 on the Uu interface (e.g., from the gNB 110 on a PDCCH).

In some aspects, the remote UE 305-2, the relay UE 305-1, and the gNB 110 may repeat one or more operations as described in connection with reference numbers 705-730 after the remote UE 305-2 receives the grant of the sidelink resource. For example, the remote UE 305-2 may transmit a scheduling request to the gNB 110 and, based at least in part on receiving the grant of the sidelink resource from the gNB 110, transmit a MAC-CE (e.g., a BSR MAC-CE) to the relay UE 305-1. In this example, the remote UE 305-2 may use the same sidelink resource to transmit a BSR (e.g., associated with and/or transmitted with data) to the relay UE 305-1 (e.g., as described below in connection with reference number 735) and/or may receive a grant of a new sidelink resource from the gNB 110.

As shown in connection with reference number 735, the remote UE 305-2 may transmit, and the relay UE 305-1 may receive, an updated BSR (e.g., associated with and/or transmitted with additional data). In some aspects, the relay UE 305-1 may receive, from the remote UE 305-2 on the PC5 interface, the updated BSR. As shown in connection with reference number 740, the relay UE 305-1 may perform a HARQ process with the gNB 110. For example, the relay UE 305-1 may perform a HARQ process similar to the HARQ process described above in connection with reference number 720 but based on whether the relay UE 305-1 received the information (e.g., a BSR and/or data) as described above in connection with reference number 735.

As shown in connection with reference number 745, the relay UE 305-1 may transmit, and the gNB 110 may receive, the updated BSR (e.g., associated with and/or transmitted with additional data) based at least in part on transmitting the grant of the sidelink resource (e.g., as described above in connection with reference number 730). In some aspects, the updated BSR may include a total amount of data buffered by the relay UE 305-1 for UEs in a scheduling group including the remote UE 305-2. Additionally, or alternatively, the updated BSR may include an amount of data buffered by the relay UE 305-1 for the remote UE 305-2. In some aspects, the updated BSR may be associated with additional data from the remote UE 305-2 that the relay UE 305-1 transmitted to the gNB 110 with the BSR.

In some aspects, the relay UE 305-1 may receive, from the gNB 110, a grant of an uplink resource. Accordingly, the relay UE 305-1 may transmit, to the gNB 110, the data (e.g., an updated BSR and/or additional data) based at least in part on receiving the grant of the uplink resource.

In some aspects, the relay UE 305-1 may receive the grant of the uplink resource based at least in part on determining a priority of data associated with the updated BSR. For example, as described above in connection with reference number 725, the relay UE 305-1 may determine the priority of data based at least in part on a priority of a logic channel in the updated BSR. Additionally, or alternatively, and as described above in connection with reference number 725, when the updated BSR includes an updated BSR MAC-CE, the priority of the data may be a highest priority of a logical channel in a non-empty logical channel group in the updated BSR.

In some aspects, the remote UE 305-2, the relay UE 305-1, and the gNB 110 may repeat one or more operations as described in connection with reference numbers 735-745 to continue transmitting data from the remote UE 305-2 to the gNB 110. For example, the remote UE 305-2 may use the same sidelink resource to transmit another updated BSR (e.g., associated with and/or transmitted with additional data) to the relay UE 305-1 and/or may transmit a new scheduling request (e.g., as described above in connection with reference number 705) in order to receive a grant of a new sidelink resource, from the gNB 110, for transmitting the updated buffer status report.

As indicated above, FIG. 7 is provided as an example. Other examples may differ from what is described with respect to FIG. 7.

Examples 600 and 700 may be combined. For example, the remote UE 305-2 may receive resource grants from the gNB 110 on a PDCCH on the Uu interface and transmit scheduling requests, messages (e.g., MAC-CEs), and/or other data to the relay UE 305-1 on a PUCCH on the PC5 interface. In this example, the remote UE 305-2, the relay UE 305-1, and the gNB 110 may function according to example 600, but the remote UE 305-2 may receive the grant of the sidelink resource from the gNB 110 on the PDCCH in addition to or in lieu of receiving the grant of the sidelink resource from the relay UE 305-1 on the sidelink channel. In another example, the remote UE 305-2 may receive resource grants from the gNB 110 on a PDCCH, transmit scheduling requests to the gNB 110 on a PUCCH on the Uu interface, and transmit messages (e.g., MAC-CEs) to the gNB 110 on a PUSCH on the Uu interface. In this example, the remote UE 305-2, the relay UE 305-1, and the gNB 110 may function according to example 600 or example 700, but the remote UE 305-2 may transmit control information (e.g., MAC-CEs) to the gNB 110 on the PUSCH in addition to or in lieu of transmitting the control information to the relay UE 305-1 on the sidelink channel. In this example, the remote UE 305-2 may only transmit data associated with the buffer status reports (e.g., associated with BSR MAC-CEs) to the relay UE 305-1 for relaying to the gNB 110.

Figure 8:
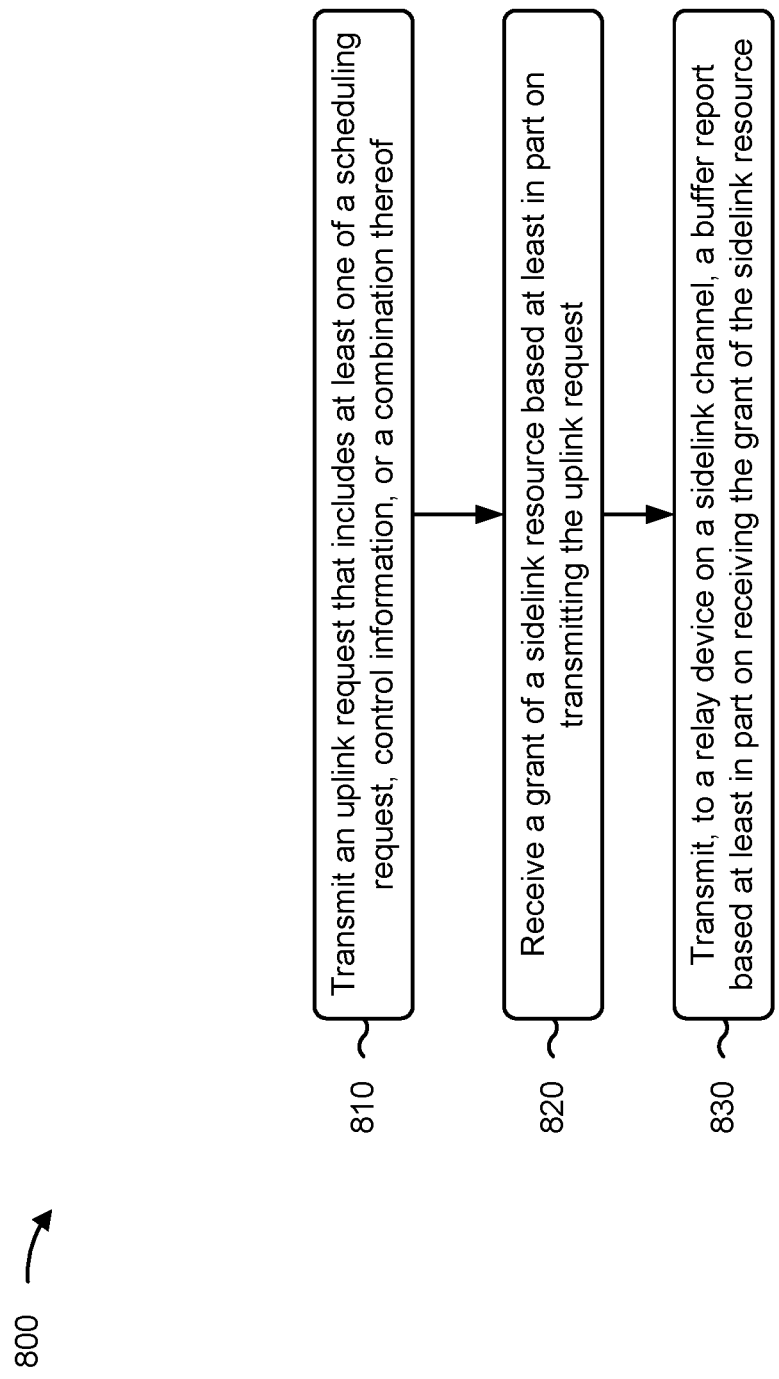
FIG. 8 is a diagram illustrating an example process performed by a UE, in accordance with the present disclosure.

FIG. 8 is a diagram illustrating an example process 800 performed, for example, by a first UE, in accordance with the present disclosure. Example process 800 is an example where the first UE (e.g., UE 120*e*, UE 120*d*, and/or remote UE 305-2) performs operations associated with scheduling uplink transmissions.

As shown in FIG. 8, in some aspects, process 800 may include transmitting an uplink request (block 810). For example, the first UE (e.g., using one or more of antenna 252, transmit processor 264, TX MIMO processor 266, modulator 254, controller/processor 280, and/or memory 282) may transmit an uplink request, as described herein. In some aspects, the uplink request includes at least one of a scheduling request, control information, or a combination thereof.

As further shown in FIG. 8, in some aspects, process 800 may include receiving a grant of a sidelink resource based at least in part on transmitting the uplink request (block 820). For example, the first UE (e.g., using one or more of antenna 252, demodulator 254, MIMO detector 256, receive processor 258, controller/processor 280, and/or memory 282) may receive a grant of a sidelink resource based at least in part on the uplink request, as described herein.

As further shown in FIG. 8, in some aspects, process 800 may include transmitting, to a relay device (e.g., UE 120*a*, relay BS 110*d*, and/or relay device 305-1) on a sidelink channel, a buffer status report based at least in part on receiving the grant of the sidelink resource (block 830). For example, the first UE (e.g., using one or more of antenna 252, transmit processor 264, TX MIMO processor 266, modulator 254, controller/processor 280, and/or memory 282) may transmit, to a relay device on a sidelink channel, a buffer status report based at least in part on the grant of the sidelink resource, as described herein.

Process 800 may include additional aspects, such as any single aspect or any combination of aspects described below and/or in connection with one or more other processes described elsewhere herein.

In a first aspect, the relay device includes at least one of a relay UE, an MT unit, or a combination thereof.

In a second aspect, alone or in combination with the first aspect, the first UE shares a MAC layer with the relay device.

In a third aspect, alone or in combination with one or more of the first and second aspects, the first UE uses a first MAC layer that is distinct from a second MAC layer shared by the relay device and at least one second UE.

In a fourth aspect, alone or in combination with one or more of the first through third aspects, the first UE shares a RNTI with the relay device.

In a fifth aspect, alone or in combination with one or more of the first through fourth aspects, the first UE uses a first RNTI that is distinct from a second RNTI shared by the relay device and at least one second UE.

In a sixth aspect, alone or in combination with one or more of the first through fifth aspects, the uplink request includes a scheduling request on the sidelink channel.

In a seventh aspect, alone or in combination with one or more of the first through sixth aspects, the scheduling request is transmitted to the relay device on a PSFCH.

In an eighth aspect, alone or in combination with one or more of the first through seventh aspects, the scheduling request is associated with an RLC PDU that includes an identifier of the first UE.

In a ninth aspect, alone or in combination with one or more of the first through eighth aspects, the uplink request includes a scheduling request that the first UE transmits to a base station on a PUCCH.

In a tenth aspect, alone or in combination with one or more of the first through ninth aspects, the uplink request includes a MAC-CE.

In an eleventh aspect, alone or in combination with one or more of the first through tenth aspects, the MAC-CE is transmitted to the relay device on a PSSCH.

In a twelfth aspect, alone or in combination with one or more of the first through eleventh aspects, the grant of the sidelink resource is received from the relay device on a PSCCH.

In a thirteenth aspect, alone or in combination with one or more of the first through twelfth aspects, the grant of the sidelink resource is received from a base station on a PDCCH.

In a fourteenth aspect, alone or in combination with one or more of the first through thirteenth aspects, process 800 further includes receiving (e.g., using one or more of antenna 252, demodulator 254, MIMO detector 256, receive processor 258, controller/processor 280, and/or memory 282) a retransmission of the grant of the sidelink resource, and retransmitting (e.g., using one or more of antenna 252, transmit processor 264, TX MIMO processor 266, modulator 254, controller/processor 280, and/or memory 282), to the relay device, the buffer status report.

In a fifteenth aspect, alone or in combination with one or more of the first through fourteenth aspects, the uplink request is transmitted based at least in part on determining (e.g., using one or more of MIMO detector 256, receive processor 258, transmit processor 264, TX MIMO processor 266, controller/processor 280, and/or memory 282) a priority of data associated with the buffer status report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
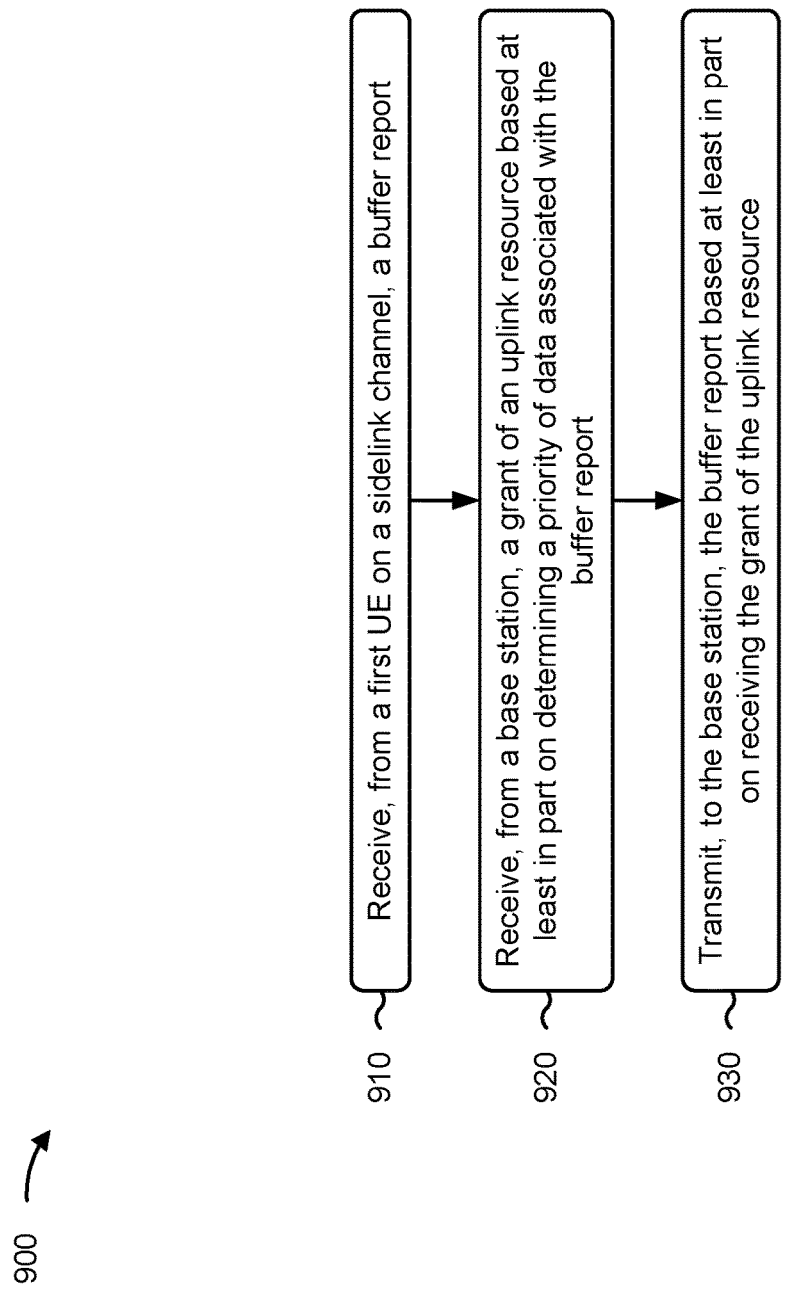
FIG. 9 is a diagram illustrating an example process performed by a relay device, in accordance with the present disclosure.

FIG. 9 is a diagram illustrating an example process 900 performed, for example, by a relay device, in accordance with the present disclosure. Example process 900 is an example where the relay device (e.g., UE 120*a*, relay BS 110*d*, and/or relay UE 305-1) performs operations associated with scheduling uplink transmissions.

As shown in FIG. 9, in some aspects, process 900 may include receiving, from a first UE (e.g., UE 120*e*, UE 120*d*, and/or remote UE 305-2) on a sidelink channel, a buffer status report (block 910). For example, the relay device (e.g., using one or more of antenna 252, demodulator 254, MIMO detector 256, receive processor 258, controller/processor 280, and/or memory 282, or using one or more of antenna 234, demodulator 232, MIMO detector 236, receive processor 238, controller/processor 240, memory 242, and/or scheduler 246) may receive, from a first UE on a sidelink channel, a buffer status report, as described herein.

As further shown in FIG. 9, in some aspects, process 900 may include receiving, from a base station (e.g., the base station 110*a*), a grant of an uplink resource based at least in part on determining a priority of data associated with the buffer status report (block 920). For example, the relay device (e.g., using one or more of antenna 252, demodulator 254, MIMO detector 256, receive processor 258, controller/processor 280, and/or memory 282, or using one or more of antenna 234, demodulator 232, MIMO detector 236, receive processor 238, controller/processor 240, memory 242, and/or scheduler 246) may receive, from a base station, a grant of an uplink resource based at least in part on determining a priority of data associated with the buffer status report, as described herein.

As further shown in FIG. 9, in some aspects, process 900 may include transmitting, to the base station, the buffer status report based at least in part on receiving the grant of the uplink resource (block 930). For example, the relay device (e.g., using one or more of transmit processor 220, TX MIMO processor 230, modulator 232, antenna 234, controller/processor 240, memory 242, and/or scheduler 246, or using one or more of antenna 252, transmit processor 264, TX MIMO processor 266, modulator 254, controller/processor 280, and/or memory 282) may transmit, to the base station, the buffer status report based at least in part on receiving the grant of the uplink resource, as described herein.

Process 900 may include additional aspects, such as any single aspect or any combination of aspects described below and/or in connection with one or more other processes described elsewhere herein.

In a first aspect, the relay device includes at least one of a relay UE, an MT unit, or a combination thereof.

In a second aspect, alone or in combination with the first aspect, the relay device shares a MAC layer with the first UE.

In a third aspect, alone or in combination with one or more of the first and second aspects, the relay device uses a first MAC layer, with the first UE, that is distinct from a second MAC layer shared by the relay device and at least one second UE.

In a fourth aspect, alone or in combination with one or more of the first through third aspects, the relay device shares a RNTI with the first UE.

In a fifth aspect, alone or in combination with one or more of the first through fourth aspects, the relay device uses a first RNTI, with the first UE, that is distinct from a second RNTI shared by the relay device and at least one second UE.

In a sixth aspect, alone or in combination with one or more of the first through fifth aspects, process 900 further includes receiving (e.g., using one or more of antenna 252, demodulator 254, MIMO detector 256, receive processor 258, controller/processor 280, and/or memory 282, or using one or more of antenna 234, demodulator 232, MIMO detector 236, receive processor 238, controller/processor 240, memory 242, and/or scheduler 246), from the first UE and on the sidelink channel, a scheduling request, such that the buffer status report is received based at least in part on receiving the scheduling request.

In a seventh aspect, alone or in combination with one or more of the first through sixth aspects, the scheduling request is received from the first UE on a PSFCH.

In an eighth aspect, alone or in combination with one or more of the first through seventh aspects, process 900 further includes transmitting (e.g., using one or more of transmit processor 220, TX MIMO processor 230, modulator 232, antenna 234, controller/processor 240, memory 242, and/or scheduler 246, or using one or more of antenna 252, transmit processor 264, TX MIMO processor 266, modulator 254, controller/processor 280, and/or memory 282), to the first UE, a grant of a sidelink resource based at least in part on receiving the scheduling request, such that the buffer status report is received based at least in part on transmitting the grant of the sidelink resource.

In a ninth aspect, alone or in combination with one or more of the first through eighth aspects, process 900 further includes receiving (e.g., using one or more of antenna 252, demodulator 254, MIMO detector 256, receive processor 258, controller/processor 280, and/or memory 282, or using one or more of antenna 234, demodulator 232, MIMO detector 236, receive processor 238, controller/processor 240, memory 242, and/or scheduler 246), from the base station, the grant of the sidelink resource.

In a tenth aspect, alone or in combination with one or more of the first through ninth aspects, process 900 further includes transmitting (e.g., using one or more of transmit processor 220, TX MIMO processor 230, modulator 232, antenna 234, controller/processor 240, memory 242, and/or scheduler 246, or using one or more of antenna 252, transmit processor 264, TX MIMO processor 266, modulator 254, controller/processor 280, and/or memory 282), to the base station, a request for the sidelink resource, such that the grant of the sidelink resource is received, from the base station, based at least in part on transmitting the request for the sidelink resource.

In an eleventh aspect, alone or in combination with one or more of the first through tenth aspects, the request for the sidelink resource is transmitted on a PUSCH.

In a twelfth aspect, alone or in combination with one or more of the first through eleventh aspects, process 900 further includes transmitting (e.g., using one or more of transmit processor 220, TX MIMO processor 230, modulator 232, antenna 234, controller/processor 240, memory 242, and/or scheduler 246, or using one or more of antenna 252, transmit processor 264, TX MIMO processor 266, modulator 254, controller/processor 280, and/or memory 282), to the base station, a scheduling request for the request for the sidelink resource, and receiving (e.g., using one or more of antenna 252, demodulator 254, MIMO detector 256, receive processor 258, controller/processor 280, and/or memory 282, or using one or more of antenna 234, demodulator 232, MIMO detector 236, receive processor 238, controller/processor 240, memory 242, and/or scheduler 246), from the base station, an uplink grant for the request for the sidelink resource, such that the request for the sidelink resource is transmitted, to the base station, based at least in part on receiving the uplink grant.

In a thirteenth aspect, alone or in combination with one or more of the first through twelfth aspects, the request for the sidelink resource is transmitted based at least in part on determining (e.g., using one or more of MIMO detector 256, receive processor 258, transmit processor 264, TX MIMO processor 266, controller/processor 280, and/or memory 282, or using one or more of transmit processor 220, TX MIMO processor 230, MIMO detector 236, receive processor 238, controller/processor 240, memory 242, and/or scheduler 246) a priority of data associated with the scheduling request.

In a fourteenth aspect, alone or in combination with one or more of the first through thirteenth aspects, the priority of data associated with the scheduling request is determined based at least in part on a priority of a logic channel in the scheduling request.

In a fifteenth aspect, alone or in combination with one or more of the first through fourteenth aspects, the request for the sidelink resource is transmitted on a PUCCH, and the PUCCH is selected based at least in part on the priority of a logic channel in the scheduling request.

In a sixteenth aspect, alone or in combination with one or more of the first through fifteenth aspects, process 900 further includes receiving (e.g., using one or more of antenna 252, demodulator 254, MIMO detector 256, receive processor 258, controller/processor 280, and/or memory 282, or using one or more of antenna 234, demodulator 232, MIMO detector 236, receive processor 238, controller/ processor 240, memory 242, and/or scheduler 246), from the first UE and on the sidelink channel, control information, such that the buffer status report is received based at least in part on receiving the control information.

In a seventeenth aspect, alone or in combination with one or more of the first through sixteenth aspects, the control information is received from the first UE on a PSSCH.

In an eighteenth aspect, alone or in combination with one or more of the first through seventeenth aspects, process 900 further includes transmitting (e.g., using one or more of transmit processor 220, TX MIMO processor 230, modulator 232, antenna 234, controller/processor 240, memory 242, and/or scheduler 246, or using one or more of antenna 252, transmit processor 264, TX MIMO processor 266, modulator 254, controller/processor 280, and/or memory 282), to the first UE, a grant of a sidelink resource based at least in part on receiving the control information, such that the buffer status report is received based at least in part on transmitting the grant of the sidelink resource.

In a nineteenth aspect, alone or in combination with one or more of the first through eighteenth aspects, the request for the sidelink resource is transmitted based at least in part on determining (e.g., using one or more of MIMO detector 256, receive processor 258, transmit processor 264, TX MIMO processor 266, controller/processor 280, and/or memory 282, or using one or more of transmit processor 220, TX MIMO processor 230, MIMO detector 236, receive processor 238, controller/processor 240, memory 242, and/or scheduler 246) a priority of data associated with the control information.

In a twentieth aspect, alone or in combination with one or more of the first through nineteenth aspects, the priority of data is determined associated with the control information based at least in part on a priority of a logic channel in the control information.

In a twenty-first aspect, alone or in combination with one or more of the first through twentieth aspects, the request for the sidelink resource is transmitted on a PUCCH, and the PUCCH is selected based at least in part on the priority of a logic channel in the control information.

In a twenty-second aspect, alone or in combination with one or more of the first through twenty-first aspects, process 900 further includes transmitting (e.g., using one or more of transmit processor 220, TX MIMO processor 230, modulator 232, antenna 234, controller/processor 240, memory 242, and/or scheduler 246, or using one or more of antenna 252, transmit processor 264, TX MIMO processor 266, modulator 254, controller/processor 280, and/or memory 282), to the base station, a NACK signal based at least in part on failing to receive information from the first UE, such that the information is received based at least in part on transmitting the NACK signal.

In a twenty-third aspect, alone or in combination with one or more of the first through twenty-second aspects, the relay device fails to receive the information based at least in part on transmitting a grant of a sidelink resource to the first UE.

In a twenty-fourth aspect, alone or in combination with one or more of the first through twenty-third aspects, process 900 further includes retransmitting (e.g., using one or more of transmit processor 220, TX MIMO processor 230, modulator 232, antenna 234, controller/processor 240, memory 242, and/or scheduler 246, or using one or more of antenna 252, transmit processor 264, TX MIMO processor 266, modulator 254, controller/processor 280, and/or memory 282), to the first UE, the grant of the sidelink resource.

In a twenty-fifth aspect, alone or in combination with one or more of the first through twenty-fourth aspects, process 900 further includes receiving (e.g., using one or more of antenna 252, demodulator 254, MIMO detector 256, receive processor 258, controller/processor 280, and/or memory 282, or using one or more of antenna 234, demodulator 232, MIMO detector 236, receive processor 238, controller/processor 240, memory 242, and/or scheduler 246), from the base station, a retransmission of the grant of the sidelink resource based at least in part on transmitting the NACK signal.

In a twenty-sixth aspect, alone or in combination with one or more of the first through twenty-fifth aspects, process 900 further includes transmitting (e.g., using one or more of transmit processor 220, TX MIMO processor 230, modulator 232, antenna 234, controller/processor 240, memory 242, and/or scheduler 246, or using one or more of antenna 252, transmit processor 264, TX MIMO processor 266, modulator 254, controller/processor 280, and/or memory 282), to the base station, an ACK signal based at least in part on receiving information from the first UE, such that the grant of the uplink resource is received based at least in part on transmitting the ACK signal.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
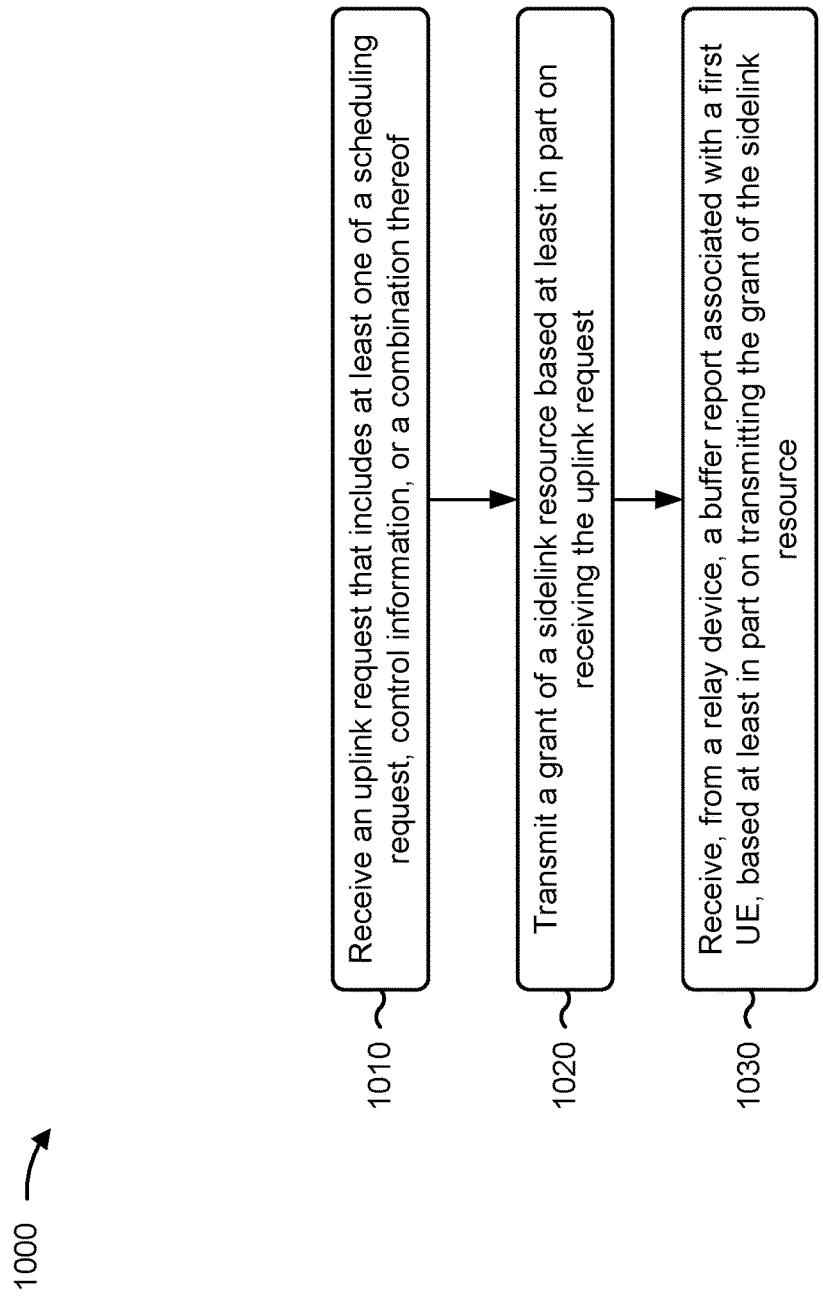
FIG. 10 is a diagram illustrating an example process performed by a base station, in accordance with the present disclosure.

FIG. 10 is a diagram illustrating an example process 1000 performed, for example, by a base station, in accordance with the present disclosure. Example process 1000 is an example where the base station (e.g., the base station 110a) performs operations associated with scheduling uplink transmissions.

As shown in FIG. 10, in some aspects, process 1000 may include receiving an uplink request (block 1010). For example, the base station (e.g., using one or more of antenna 234, demodulator 232, MIMO detector 236, receive processor 238, controller/processor 240, memory 242, and/or scheduler 246) may receive an uplink request, as described herein. In some aspects, the uplink request includes at least one of a scheduling request, control information, or a combination thereof.

As further shown in FIG. 10, in some aspects, process 1000 may include transmitting a grant of a sidelink resource based at least in part on receiving the uplink request (block 1020). For example, the base station (e.g., using one or more of transmit processor 220, TX MIMO processor 230, modulator 232, antenna 234, controller/processor 240, memory 242, and/or scheduler 246) may transmit a grant of a sidelink resource based at least in part on receiving the uplink request, as described herein.

As further shown in FIG. 10, in some aspects, process 1000 may include receiving, from a relay device (e.g., UE 120a, relay BS 110d, and/or relay device 305-1), a buffer status report associated with a first UE (e.g., UE 120e, UE 120d, and/or remote UE 305-2), based at least in part on transmitting the grant of the sidelink resource (block 1030). For example, the base station (e.g., using one or more of antenna 234, demodulator 232, MIMO detector 236, receive processor 238, controller/processor 240, memory 242, and/or scheduler 246) may receive, from a relay device, a buffer status report associated with a first UE, based at least in part on transmitting the grant of the sidelink resource, as described herein.

Process 800 may include additional aspects, such as any single aspect or any combination of aspects described below and/or in connection with one or more other processes described elsewhere herein.

In a first aspect, the relay device includes at least one of a relay UE, an MT unit, or a combination thereof.

In a second aspect, alone or in combination with the first aspect, the grant of the sidelink resource is transmitted to the relay device.

In a third aspect, alone or in combination with one or more of the first and second aspects, process 1000 further includes receiving (e.g., using one or more of antenna 234, demodulator 232, MIMO detector 236, receive processor 238, controller/processor 240, memory 242, and/or scheduler 246) a request for the sidelink resource on a physical uplink shared channel.

In a fourth aspect, alone or in combination with one or more of the first through third aspects, process 1000 further includes receiving (e.g., using one or more of antenna 234, demodulator 232, MIMO detector 236, receive processor 238, controller/processor 240, memory 242, and/or scheduler 246), from the relay device, a scheduling request for a request for the sidelink resource, and transmitting (e.g., using one or more of transmit processor 220, TX MIMO processor 230, modulator 232, antenna 234, controller/processor 240, memory 242, and/or scheduler 246), to the relay device, an uplink grant for the request for the sidelink resource, such that the request for the sidelink resource is received based at least in part on transmitting the uplink grant.

In a fifth aspect, alone or in combination with one or more of the first through fourth aspects, the scheduling request, for the request for the sidelink resource, is received on a PUCCH, where the PUCCH is selected based at least in part on a priority associated with the first UE.

In a sixth aspect, alone or in combination with one or more of the first through fifth aspects, the grant of the sidelink resource is transmitted to the first UE.

In a seventh aspect, alone or in combination with one or more of the first through sixth aspects, the uplink request includes a scheduling request received from the first UE.

In an eighth aspect, alone or in combination with one or more of the first through seventh aspects, process 1000 further includes transmitting (e.g., using one or more of transmit processor 220, TX MIMO processor 230, modulator 232, antenna 234, controller/processor 240, memory 242, and/or scheduler 246), to the relay device, a grant of an uplink resource for the buffer status report, such that the buffer status report is received based at least in part on transmitting the grant of the uplink resource.

In a ninth aspect, alone or in combination with one or more of the first through eighth aspects, process 1000 further includes receiving (e.g., using one or more of antenna 234, demodulator 232, MIMO detector 236, receive processor 238, controller/processor 240, memory 242, and/or scheduler 246), from the relay device, a scheduling request for the grant of the uplink resource for the buffer status report, such that the grant of the uplink resource is transmitted based at least in part on receiving the scheduling request.

In a tenth aspect, alone or in combination with one or more of the first through ninth aspects, process 1000 further includes receiving (e.g., using one or more of antenna 234, demodulator 232, MIMO detector 236, receive processor 238, controller/processor 240, memory 242, and/or scheduler 246), from the relay device, an ACK signal based at least in part on the relay device receiving the buffer status report, such that the uplink grant is transmitted to the relay device based at least in part on receiving the ACK signal.

In an eleventh aspect, alone or in combination with one or more of the first through tenth aspects, process 1000 further includes receiving (e.g., using one or more of antenna 234, demodulator 232, MIMO detector 236, receive processor 238, controller/processor 240, memory 242, and/or scheduler 246), from the relay device, a NACK signal based at least in part on the relay device failing to receive information from the first UE, and retransmitting (e.g., using one or more of transmit processor 220, TX MIMO processor 230, modulator 232, antenna 234, controller/processor 240, memory 242, and/or scheduler 246) the grant of the sidelink resource based at least in part on receiving the NACK signal.

In a twelfth aspect, alone or in combination with one or more of the first through eleventh aspects, the grant of the sidelink resource is retransmitted to the relay device.

In a thirteenth aspect, alone or in combination with one or more of the first through twelfth aspects, the grant of the sidelink resource is retransmitted to the first UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a first user equipment (UE), comprising: transmitting an uplink request, wherein the uplink request includes at least one of a scheduling request, control information, or a combination thereof receiving a grant of a sidelink resource based at least in part on transmitting the uplink request; and transmitting, to a relay device on a sidelink channel, a buffer status report based at least in part on receiving the grant of the sidelink resource.

Aspect 2: The method of Aspect 1, wherein the relay device includes at least one of a relay UE, a mobile termination (MT) unit, or a combination thereof.

Aspect 3: The method of any of Aspects 1 through 2, wherein the first UE shares a medium access control (MAC) layer with the relay device.

Aspect 4: The method of Aspect 3, wherein the first UE shares a radio network temporary identifier (RNTI) with the relay device.

Aspect 5: The method of any of Aspects 1 through 2, wherein the first UE uses a first medium access control (MAC) layer that is distinct from a second MAC layer shared by the relay device and at least one second UE.

Aspect 6: The method of Aspect 5, wherein the first UE uses a first radio network temporary identifier (RNTI) that is distinct from a second RNTI shared by the relay device and at least one second UE.

Aspect 7: The method of any of Aspects 1 through 6, wherein the uplink request includes a scheduling request on the sidelink channel.

Aspect 8: The method of Aspect 7, wherein the scheduling request is transmitted to the relay device on a physical sidelink feedback channel.

Aspect 9: The method of any of Aspects 7 through 8, wherein the scheduling request is associated with a radio link protocol packet data unit that includes an identifier of the first UE.

Aspect 10: The method of any of Aspects 1 through 6, wherein the uplink request includes a scheduling request that the first UE transmits to a base station on a physical uplink control channel.

Aspect 11: The method of any of Aspects 1 through 6, wherein the uplink request includes a medium access control (MAC) layer control element (MAC-CE).

Aspect 12: The method of Aspect 11, wherein the MAC-CE is transmitted to the relay device on a physical sidelink shared channel.

Aspect 13: The method of any of Aspects 1 through 12, wherein the grant of the sidelink resource is received from the relay device on a physical sidelink control channel.

Aspect 14: The method of any of Aspects 1 through 12, wherein the grant of the sidelink resource is received from a base station on a physical downlink control channel.

Aspect 15: The method of any of Aspects 1 through 14, further comprising: receiving a retransmission of the grant of the sidelink resource; and retransmitting, to the relay device, the buffer status report.

Aspect 16: The method of any of Aspects 1 through 15, wherein the uplink request is transmitted based at least in part on determining a priority of data that triggered the uplink request.

Aspect 17: A method of wireless communication performed by a relay device, comprising: receiving, from a first user equipment (UE) on a sidelink channel, a buffer status report; receiving, from a base station, a grant of an uplink resource based at least in part on determining a priority of data associated with the buffer status report; and transmitting, to the base station, the buffer status report based at least in part on receiving the grant of the uplink resource.

Aspect 18: The method of Aspect 17, wherein the relay device includes at least one of a relay UE, a mobile termination (MT) unit, or a combination thereof.

Aspect 19: The method of any of Aspects 17 through 18, wherein the relay device shares a medium access control (MAC) layer on the sidelink channel with the first UE.

Aspect 20: The method of Aspect 19, wherein the relay device shares a radio network temporary identifier (RNTI) with the first UE.

Aspect 21: The method of any of Aspects 17 through 18, wherein the relay device uses a first medium access control (MAC) layer, with the first UE, that is distinct from a second MAC layer shared by the relay device and at least one second UE.

Aspect 22: The method of Aspect 21, wherein the relay device uses a first radio network temporary identifier (RNTI), with the first UE, that is distinct from a second RNTI shared by the relay device and at least one second UE.

Aspect 23: The method of any of Aspects 17 through 22, further comprising: receiving, from the first UE and on the sidelink channel, a scheduling request, wherein the buffer status report is received based at least in part on receiving the scheduling request.

Aspect 24: The method of Aspect 23, wherein the scheduling request is received from the first UE on a physical sidelink feedback channel.

Aspect 25: The method of any of Aspects 23 through 24, further comprising: transmitting, to the first UE, a grant of a sidelink resource based at least in part on receiving the scheduling request, wherein the buffer status report is received based at least in part on transmitting the grant of the sidelink resource.

Aspect 26: The method of Aspect 25, further comprising: receiving, from the base station, the grant of the sidelink resource.

Aspect 27: The method of Aspect 26, further comprising: transmitting, to the base station, a request for the sidelink resource, wherein the grant of the sidelink resource is received, from the base station, based at least in part on transmitting the request for the sidelink resource.

Aspect 28: The method of Aspect 27, wherein the request for the sidelink resource is transmitted on a physical uplink shared channel.

Aspect 29: The method of any of Aspects 27 through 28, further comprising: transmitting, to the base station, a scheduling request for the request for the sidelink resource; and receiving, from the base station, an uplink grant for the request for the sidelink resource, wherein the request for the sidelink resource is transmitted, to the base station, based at least in part on receiving the uplink grant.

Aspect 30: The method of any of Aspects 27 through 29, wherein the request for the sidelink resource is transmitted based at least in part on determining a priority of data associated with the scheduling request.

Aspect 31: The method of Aspect 30, wherein the priority of data associated with the scheduling request is determined based at least in part on a priority of a logic channel in the scheduling request.

Aspect 32: The method of Aspect 31, wherein the request for the sidelink resource is transmitted on a physical uplink control channel (PUCCH), wherein the PUCCH is selected based at least in part on the priority of the logic channel in the scheduling request.

Aspect 33: The method of any of Aspects 17 through 32, further comprising: receiving, from the first UE and on the sidelink channel, control information, wherein the buffer status report is received based at least in part on receiving the control information.

Aspect 34: The method of Aspect 33, wherein the control information is received from the first UE on a physical sidelink shared channel.

Aspect 35: The method of any of Aspects 33 through 34, further comprising: transmitting, to the first UE, a grant of a sidelink resource based at least in part on receiving the control information, wherein the buffer status report is received based at least in part on transmitting the grant of the sidelink resource.

Aspect 36: The method of Aspect 35, further comprising: receiving, from the base station, the grant of the sidelink resource.

Aspect 37: The method of Aspect 36, further comprising: transmitting, to the base station, a request for the sidelink resource, wherein the grant of the sidelink resource is received, from the base station, based at least in part on transmitting the request for the sidelink resource.

Aspect 38: The method of Aspect 37, wherein the request for the sidelink resource is transmitted on a physical uplink shared channel.

Aspect 39: The method of any of Aspects 37 through 38, further comprising: transmitting, to the base station, a scheduling request for the request for the sidelink resource; and receiving, from the base station, an uplink grant for the request for the sidelink resource, wherein the request for the sidelink resource is transmitted, to the base station, based at least in part on receiving the uplink grant.

Aspect 40: The method of any of Aspects 37 through 39, wherein the request for the sidelink resource is transmitted based at least in part on determining a priority of data associated with the control information.

Aspect 41: The method of Aspect 40, wherein the priority of data is determined associated with the control information based at least in part on a priority of a logic channel in the control information.

Aspect 42: The method of Aspect 41, wherein the request for the sidelink resource is transmitted on a physical uplink control channel (PUCCH), wherein the PUCCH is selected based at least in part on the priority of the logic channel in the control information.

Aspect 43: The method of any of Aspects 17 through 42, further comprising: transmitting, to the base station, a negative-acknowledgment (NACK) signal based at least in part on failing to receive information from the first UE, wherein the information is received based at least in part on transmitting the NACK signal.

Aspect 44: The method of Aspect 43, wherein the relay device fails to receive the information based at least in part on transmitting a grant of a sidelink resource to the first UE.

Aspect 45: The method of Aspect 44, further comprising: retransmitting, to the first UE, the grant of the sidelink resource.

Aspect 46: The method of any of Aspects 44 through 45, further comprising: receiving, from the base station, a retransmission of the grant of the sidelink resource based at least in part on transmitting the NACK signal.

Aspect 47: The method of any of Aspects 17 through 42, further comprising: transmitting, to the base station, an acknowledgment (ACK) signal based at least in part on receiving information from the first UE, wherein the grant of the uplink resource is received based at least in part on transmitting the ACK signal.

Aspect 48: A method of wireless communication performed by a base station, comprising: receiving an uplink request, wherein the uplink request includes at least one of a scheduling request, control information, or a combination thereof; transmitting a grant of a sidelink resource based at least in part on receiving the uplink request; and receiving, from a relay device, a buffer status report associated with a first user equipment (UE), based at least in part on transmitting the grant of the sidelink resource.

Aspect 49: The method of Aspect 48, wherein the relay device includes at least one of a relay UE, a mobile termination (MT) unit, or a combination thereof.

Aspect 50: The method of any of Aspects 48 through 49, the grant of the sidelink resource is transmitted to the relay device.

Aspect 51: The method of Aspect 50, further comprising: receiving a request for the sidelink resource on a physical uplink shared channel.

Aspect 52: The method of any of Aspects 50 through 51, further comprising: receiving, from the relay device, a scheduling request for a request for the sidelink resource; and transmitting, to the relay device, an uplink grant for the request for the sidelink resource, wherein the request for the sidelink resource is received based at least in part on transmitting the uplink grant.

Aspect 53: The method of Aspect 52, wherein the scheduling request, for the request for the sidelink resource, is received on a physical uplink control channel (PUCCH), wherein the PUCCH is selected based at least in part on a priority associated with the first UE.

Aspect 54: The method of any of Aspects 48 through 49, wherein the grant of the sidelink resource is transmitted to the first UE.

Aspect 55: The method of any of Aspects 48 through 54, wherein the uplink request includes a scheduling request received from the first UE.

Aspect 56: The method of any of Aspects 48 through 55, further comprising: transmitting, to the relay device, a grant of an uplink resource for the buffer status report, wherein the buffer status report is received based at least in part on transmitting the grant of the uplink resource.

Aspect 57: The method of Aspect 56, further comprising: receiving, from the relay device, a scheduling request for the grant of the uplink resource for the buffer status report, wherein the grant of the uplink resource is transmitted based at least in part on receiving the scheduling request.

Aspect 58: The method of any of Aspects 56 through 57, further comprising: receiving, from the relay device, an acknowledgment (ACK) signal based at least in part on the relay device receiving the buffer status report, wherein the uplink grant is transmitted to the relay device based at least in part on receiving the ACK signal.

Aspect 59: The method of any of Aspects 48 through 58, further comprising: receiving, from the relay device, a negative-acknowledgment (NACK) signal based at least in part on the relay device failing to receive information from the first UE; and retransmitting the grant of the sidelink resource based at least in part on receiving the NACK signal.

Aspect 60: The method of Aspect 59, wherein the grant of the sidelink resource is retransmitted to the relay device.

Aspect 61: The method of Aspect 59, wherein the grant of the sidelink resource is retransmitted to the first UE.

Aspect 62: An apparatus for wireless communication at a device, comprising a processor; memory coupled with the processor; and instructions stored in the memory and executable by the processor to cause the apparatus to perform the method of one or more of Aspects 1-16.

Aspect 63: A device for wireless communication, comprising a memory and one or more processors coupled to the memory, the one or more processors configured to perform the method of one or more of Aspects 1-16.

Aspect 64: An apparatus for wireless communication, comprising at least one means for performing the method of one or more of Aspects 1-16.

Aspect 65: A non-transitory computer-readable medium storing code for wireless communication, the code comprising instructions executable by a processor to perform the method of one or more of Aspects 1-16.

Aspect 66: A non-transitory computer-readable medium storing a set of instructions for wireless communication, the set of instructions comprising one or more instructions that, when executed by one or more processors of a device, cause the device to perform the method of one or more of Aspects 1-16.

Aspect 67: An apparatus for wireless communication at a device, comprising a processor; memory coupled with the processor; and instructions stored in the memory and executable by the processor to cause the apparatus to perform the method of one or more of Aspects 17-47.

Aspect 68: A device for wireless communication, comprising a memory and one or more processors coupled to the memory, the one or more processors configured to perform the method of one or more of Aspects 17-47.

Aspect 69: An apparatus for wireless communication, comprising at least one means for performing the method of one or more of Aspects 17-47.

Aspect 70: A non-transitory computer-readable medium storing code for wireless communication, the code comprising instructions executable by a processor to perform the method of one or more of Aspects 17-47.

Aspect 71: A non-transitory computer-readable medium storing a set of instructions for wireless communication, the set of instructions comprising one or more instructions that, when executed by one or more processors of a device, cause the device to perform the method of one or more of Aspects 17-47.

Aspect 72: An apparatus for wireless communication at a device, comprising a processor; memory coupled with the processor; and instructions stored in the memory and executable by the processor to cause the apparatus to perform the method of one or more of Aspects 48-61.

Aspect 73: A device for wireless communication, comprising a memory and one or more processors coupled to the memory, the one or more processors configured to perform the method of one or more of Aspects 48-61.

Aspect 74: An apparatus for wireless communication, comprising at least one means for performing the method of one or more of Aspects 48-61.

Aspect 75: A non-transitory computer-readable medium storing code for wireless communication, the code comprising instructions executable by a processor to perform the method of one or more of Aspects 48-61.

Aspect 76: A non-transitory computer-readable medium storing a set of instructions for wireless communication, the set of instructions comprising one or more instructions that, when executed by one or more processors of a device, cause the device to perform the method of one or more of Aspects 48-61.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
 a memory; and
 one or more processors coupled to the memory, the one or more processors configured to:
  transmit an uplink request based at least in part on a priority of data, wherein a priority of a logical channel in the uplink request indicates the priority of the data associated with the uplink request, and wherein the uplink request includes at least one of a scheduling request, control information, or a combination thereof;
  receive a grant of a sidelink resource based at least in part on transmitting the uplink request; and
  transmit, to a relay device on a sidelink channel, a buffer status report associated with the data based at least in part on receiving the grant of the sidelink resource.

2. The first UE of claim 1, wherein the first UE shares a medium access control (MAC) layer with the relay device.

3. The first UE of claim 1, wherein the first UE uses a first medium access control (MAC) layer that is distinct from a second MAC layer shared by the relay device and at least one second UE.

4. The first UE of claim 1, wherein the first UE shares a radio network temporary identifier (RNTI) with the relay device.

5. The first UE of claim 1, wherein the first UE uses a first radio network temporary identifier (RNTI) that is distinct from a second RNTI shared by the relay device and at least one second UE.

6. The first UE of claim 1, wherein the one or more processors are further configured to:
 receive a retransmission of the grant of the sidelink resource; and
 retransmit, to the relay device, the buffer status report.

7. A relay device for wireless communication, comprising:
a memory; and
one or more processors coupled to the memory, the one or more processors configured to:
receive, from a first user equipment (UE) on a sidelink channel, a buffer status report;
transmit, to a network entity, a scheduling request for a grant of an uplink resource based at least in part on determining a priority of data associated with the buffer status report, the priority of the data being based at least in part on a priority of a logical channel in the buffer status report; and
transmit, to the network entity, the buffer status report based at least in part on receiving the grant of the uplink resource.

8. The relay device of claim 7, wherein the relay device shares a medium access control (MAC) layer on the sidelink channel with the first UE.

9. The relay device of claim 7, wherein the relay device uses a first medium access control (MAC) layer, with the first UE, that is distinct from a second MAC layer shared by the relay device and at least one second UE.

10. The relay device of claim 7, wherein the relay device shares a radio network temporary identifier (RNTI) with the first UE.

11. The relay device of claim 7, wherein the relay device uses a first radio network temporary identifier (RNTI), with the first UE, that is distinct from a second RNTI shared by the relay device and at least one second UE.

12. The relay device of claim 7, wherein the one or more processors are further configured to:
receive, from the first UE and on the sidelink channel, a scheduling request,
wherein the buffer status report is received based at least in part on receiving the scheduling request.

13. The relay device of claim 12, wherein the one or more processors are further configured to:
transmit, to the first UE, a grant of a sidelink resource based at least in part on receiving the scheduling request,
wherein the buffer status report is received based at least in part on transmitting the grant of the sidelink resource.

14. The relay device of claim 13, wherein the one or more processors are further configured to:
receive, from the network entity, the grant of the sidelink resource.

15. The relay device of claim 14, wherein the one or more processors are further configured to:
transmit, to the network entity, a request for the sidelink resource,
wherein the grant of the sidelink resource is received, from the network entity, based at least in part on transmitting the request for the sidelink resource.

16. The relay device of claim 15, wherein the one or more processors are further configured to:
transmit, to the network entity, a scheduling request for the request for the sidelink resource; and
receive, from the network entity, an uplink grant for the request for the sidelink resource,
wherein the request for the sidelink resource is transmitted, to the network entity, based at least in part on receiving the uplink grant.

17. The relay device of claim 7, wherein the one or more processors are further configured to:
receive, from the first UE and on the sidelink channel, control information,
wherein the buffer status report is received based at least in part on receiving the control information.

18. The relay device of claim 17, wherein the one or more processors are further configured to:
transmit, to the first UE, a grant of a sidelink resource based at least in part on receiving the control information,
wherein the buffer status report is received based at least in part on transmitting the grant of the sidelink resource.

19. The relay device of claim 18, wherein the one or more processors are further configured to:
receive, from the network entity, the grant of the sidelink resource.

20. The relay device of claim 19, wherein the one or more processors are further configured to:
transmit, to the network entity, a request for the sidelink resource,
wherein the grant of the sidelink resource is received, from the network entity, based at least in part on transmitting the request for the sidelink resource.

21. The relay device of claim 20, wherein the one or more processors are further configured to:
transmit, to the network entity, a scheduling request for the request for the sidelink resource; and
receive, from the network entity, an uplink grant for the request for the sidelink resource,
wherein the request for the sidelink resource is transmitted, to the network entity, based at least in part on receiving the uplink grant.

22. The relay device of claim 20, wherein the request for the sidelink resource is transmitted based at least in part on determination of the priority of the data associated with the control information.

23. The relay device of claim 22, wherein the request for the sidelink resource is transmitted on a physical uplink control channel (PUCCH), wherein the PUCCH is selected based at least in part on the priority of the logical channel in the control information.

24. The relay device of claim 7, wherein the one or more processors are further configured to:
transmit, to the network entity, a negative-acknowledgment (NACK) signal based at least in part on failing to receive information from the first UE,
wherein the information is received based at least in part on transmitting the NACK signal.

25. The relay device of claim 24, wherein the relay device fails to receive the information based at least in part on transmitting a grant of a sidelink resource to the first UE.

26. The relay device of claim 25, wherein the one or more processors are further configured to:
retransmit, to the first UE, the grant of the sidelink resource.

27. The relay device of claim 25, wherein the one or more processors are further configured to:
receive, from the network entity, a retransmission of the grant of the sidelink resource based at least in part on transmitting the NACK signal.

28. The relay device of claim 7, wherein the one or more processors are further configured to:
transmit, to the network entity, an acknowledgment (ACK) signal based at least in part on receiving information from the first UE, wherein the grant of the uplink resource is received based at least in part on transmitting the ACK signal.

29. A network entity for wireless communication, comprising:
a memory; and
one or more processors coupled to the memory, the one or more processors configured to:
receive an uplink request, wherein a priority of a logical channel in the uplink request indicates a priority of data associated with the uplink request, and wherein the uplink request includes at least one of a scheduling request, control information, or a combination thereof;
transmit a grant of a sidelink resource based at least in part on the priority of the data associated with the uplink request; and
receive, from a relay device, a buffer status report associated with a first user equipment (UE), based at least in part on transmitting the grant of the sidelink resource, the buffer status report being associated with the data.

30. A method of wireless communication performed by a relay device, comprising:
receiving, from a first user equipment (UE) on a sidelink channel, a buffer status report;
transmitting, to a network entity, a scheduling request for a grant of an uplink resource based at least in part on determining a priority of data associated with the buffer status report, the priority of the data being based at least in part on a priority of a logical channel in the buffer status report; and
transmitting, to the network entity, the buffer status report based at least in part on receiving the grant of the uplink resource.

* * * * *